United States Patent
Nagano et al.

(10) Patent No.: US 7,006,887 B2
(45) Date of Patent: Feb. 28, 2006

(54) OPTICAL MODELING METHOD

(75) Inventors: Kazuhiko Nagano, Kanagawa (JP);
Yoji Okazaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 284 days.

(21) Appl. No.: 10/137,732

(22) Filed: May 3, 2002

(65) Prior Publication Data

US 2003/0033128 A1   Feb. 13, 2003

(30) Foreign Application Priority Data

May 8, 2001   (JP)   ............................. 2001-137281

(51) Int. Cl.
*G06F 19/00* (2006.01)
(52) U.S. Cl. ...................... 700/120; 264/401
(58) Field of Classification Search ........ 700/118–120;
430/269; 264/269, 401; 382/154
See application file for complete search history.

(56) References Cited

U.S. PATENT DOCUMENTS

| | | | | |
|---|---|---|---|---|
| 5,171,490 A | * | 12/1992 | Fudim | 264/401 |
| 5,253,177 A | * | 10/1993 | Saito et al. | 700/119 |
| 5,500,069 A | * | 3/1996 | Ogue et al. | 264/401 |
| 6,051,179 A | * | 4/2000 | Hagenau | 264/401 |
| 6,097,361 A | * | 8/2000 | Rohner | 345/87 |
| 6,180,050 B1 | * | 1/2001 | Arai et al. | 264/401 |
| 6,270,335 B1 | * | 8/2001 | Leyden et al. | 425/375 |
| 6,500,378 B1 | * | 12/2002 | Smith | 264/401 |

FOREIGN PATENT DOCUMENTS

| | | |
|---|---|---|
| JP | 5-154924 | 6/1993 |
| JP | 6-114949 | 4/1994 |
| JP | 2715527 | 11/1997 |

* cited by examiner

*Primary Examiner*—Leo Picard
*Assistant Examiner*—Alexander Kosowski
(74) *Attorney, Agent, or Firm*—Sughrue Mion, PLLC

(57) ABSTRACT

The present invention provides an optical modeling method capable of inhibiting distortion in an object to be modeled and modeling with higher precision. A square exposure region is divided into a plurality of pixels which are further divided into first and second pixel sub-groups, the first pixel sub-group is exposed such that neighboring pixels or more are not exposed at one time, and then unexposed pixels incorporated in the second pixel sub-group are exposed two neighboring pixels or more are not exposed at one time. A photo-curable resin is exposed twice, and then cured in an amount of one photo-curable resin layer. Accordingly, the neighboring pixels are not exposed at one time, the producing of curing shrinkage is limited within one pixel, and distortion due to the curing shrinkage does not spread to the pixels neighboring the one pixel, whereby distortion in the object to be modeled can be inhibited significantly, and modeling with higher precision is made possible.

29 Claims, 18 Drawing Sheets

FIG.12
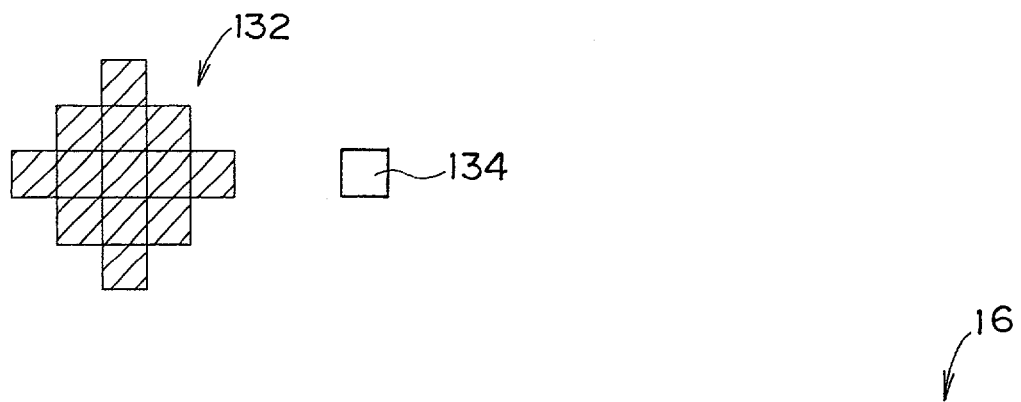
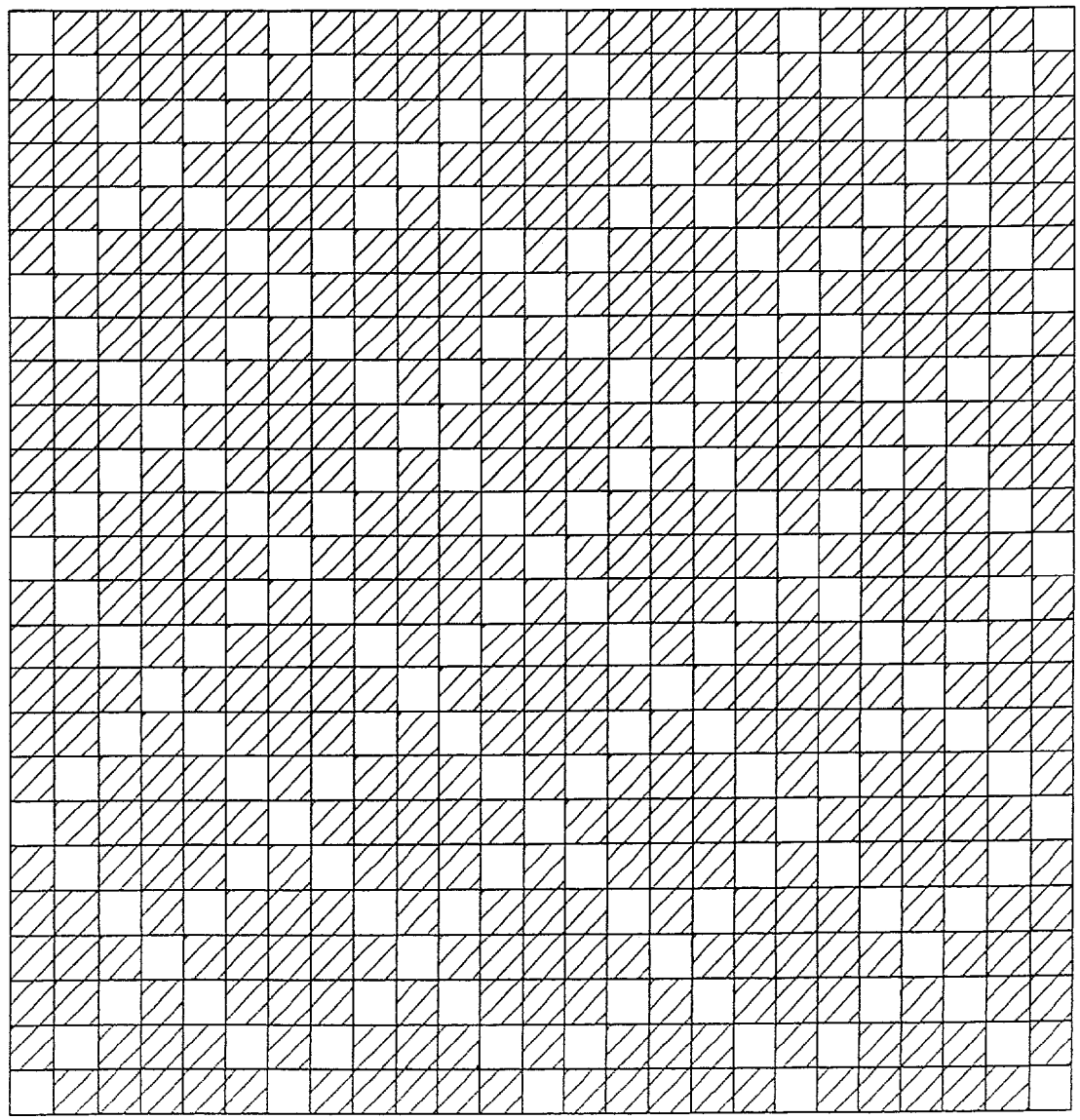

LAYERING DIRECTION

LAYERING DIRECTION

OPTICAL MODELING METHOD

BACKGROUND OF THE INVENTION

1. Field of the Invention

The present invention relates to an optical modeling method, and more particularly to an optical modeling method in which a three-dimensional model is created by exposing a photo-curable resin to a light beam.

2. Description of the Related Art

Recently, with the spread of three-dimensional computer-aided design (CAD) systems, an optical modeling system has come into general use in which a three-dimensional form is created in a virtual spacing on a computer, a photo-curable resin is exposed with a light beam on the basis of CAD data of the three-dimensional object, and is modeled to an actual three-dimensional model by using the three-dimensional CAD system. The optical modeling system comprises the steps of creating a plurality of cross sectional data by slicing CAD data at regular spacings; hardening the photo-curable resin into layers by scanning the surface of a liquid type photo-curable resin with the irradiation of laser light on the basis of each cross sectional data as shown in FIG. 17A; and modeling a three-dimensional model by layering a photo-curable resin layer sequentially. As an optical modeling method, a free liquid surfacing method is widely known in which a liquid type photo-curable resin is reserved in an open top reservoir beforehand, and a photo-curable resin layer is layered while gradually sinking a modeling table disposed near the liquid surface of the photo-curable resin from a free liquid surface of the photo-curable resin.

In this optical modeling method, polymerization shrinkage is produced by the curing of a photo-curable resin, and curing shrinkage is produced by heat distortion in which resin, which is once heated to a high temperature by polymerization heat during the curing of the photo-curable resin, is then cooled to room temperature. This shrinkage due to resin curing causes a problem in that an object to be optically modeled is distorted, thereby deteriorating modeling accuracy.

Especially when a region incorporating therein a plurality of pixels is exposed at one time (surface exposure) and cured into a plate shape, as shown in FIG. 17B, an object to be optically-modeled is distorted and warped to form a downward concave shape relative to a direction in which photo-curable resin layers are layered.

As a method of inhibiting such distortions caused into an object to be modeled, Japanese Patent Application Laid-Open (JP-A) No. 6-114949 discloses a photo-curable modeling method in which a direction that the photo-curable resin is scanned with a light beam is inverted every one other layer or every several other layers of the resin to be scanned by the light beam. In the photo-curable modeling method, it is noted that the photo-curable resin layer easily curves with a portion of the layer to be scanned with the light beam at the end of the scanning, put inside the layer, directions in which the photo-curable layers to be layered are scanned with the light beam are inverted, and stress that attempts to flex in one direction is offset, whereby distortion can be inhibited. However, in the photo-curable modeling method, since each photo-curable resin layer is formed by scanning and exposing the resin with a single light beam, a problem is caused in that much time is taken for modeling.

Further, Japanese Patent Application Laid-Open (JP-A) No. 5-154924 discloses a method of modeling using a layered plate (hereinafter, "a layered plate modeling method") in the photo-curable modeling method, in which a layer having an uncured portion (i.e., unexposed portion) left thereon is formed, the uncured portion underlying an upper layer is cured at the same time when the upper layer is cured, and the layered plate is formed. In the layered plate modeling method, shrinkage stress caused by the curing of the upper layer and shrinkage stress caused by the curing of the uncured portion are offset to thereby control distortion of the object to be optically modeled. However, in the layered plate modeling method, since the uncured portion of the layer is gradually cured, a problem is caused in that configuration of the object to be optically modeled changes with times, thereby deteriorating modeling accuracy.

SUMMARY OF THE INVENTION

In view of the aforementioned facts, an object of the present invention is to provide an optical modeling method in which distortion of an object to be optically modeled can be inhibited, and modeling with high accuracy is made possible.

In order to accomplish the aforementioned object, the present invention is an optical modeling method in which a photo-curable resin is exposed with a light beam to form a three-dimensional model, the method comprising the steps of dividing a region of the photo-curable resin to be exposed into a plurality of pixels, exposing the pixels such that a number of neighboring pixels that are being exposed at any one time does not exceed a predetermined number, and thereafter, exposing unexposed pixels of the region.

In the optical modeling method of the present invention, the exposure region of the photo-curable resin is divided into a plurality of pixels, the plurality of pixels are exposed such that neighboring pixels exceeding a predetermined number are not exposed at one time, and thereafter, the unexposed pixels are exposed. Therefore, distortion due to curing shrinkage does not spread to the pixels that have not been exposed at one time, and distortion in an object to be optically molded can be inhibited, whereby optical modeling with high precision is enabled. For example, if the unexposed pixels are exposed after pixels are exposed such that two neighboring pixels or more are not exposed at one time, distortion due to the curing shrinkage is caused within a range of one pixel, without spreading to pixels neighboring the one pixel. Further, the neighboring pixels represent pixels that are connected to one another at two points or more such that, if each pixel is formed in a polygon-shape, two pixels share the same side of the polygon.

In the optical modeling method of the present invention, pixels are exposed such that neighboring pixels exceeding a predetermined number are not exposed at one time. Namely, neighboring pixels less than a predetermined number are exposed at one time as one single pixel sub-group. In this case, it is preferable that the predetermined number is not more than 75% of the total number of pixels in the region to be exposed. For example, if the exposure region of the photo-curable resin is divided into one million pixels, one pixel sub-group to be exposed at one time may comprise 750,000 pixels or less. If the exposure region is divided into two regions, and after one region has been exposed, the other region is exposed. Then, distortion can be inhibited more efficiently as compared to a case in which the entire exposure region is exposed at one time. However, if the number of neighboring pixels less than a predetermined number exceeds 75% of the total number of the pixels in the region to be exposed, it is difficult to obtain sufficient effects by the exposure region divided into the plurality of the pixels.

When the total number of pixels in the exposure region is y, it is preferable that the predetermined number n is determined so as to satisfy the expression. For example, if the number of pixels in the exposure region is one million, pixels are exposed such that neighboring pixels exceeding one hundred are not exposed at one time.

$$n \le \frac{\sqrt{y}}{10}.$$

It is particularly preferable that the predetermined number n of pixels is from 2 to 26. The number of pixels within a predetermined range is incorporated in one pixel sub-group to be exposed at one time, whereby distortion due to the curing shrinkage is produced merely within the range without spreading to the neighboring pixels.

In the aforementioned optical modeling method, it is preferable that an area of a group of neighboring pixels that are exposed at the same time is at most 1 mm². If one pixel sub-group to be exposed at one time has a smaller size, the producing of distortion can be inhibited more efficiently. Further, it is preferable that groups of neighboring pixels that are exposed at the same time are spacings apart from one another by at least 0.25 mm. Uncured resins are supplied from the unexposed regions into the region that was exposed at the initial stage of exposure, whereby the producing of distortion due to the curing shrinkage can be inhibited. However, when one pixel sub-groups are disposed too close to one another, the uncured resin cannot be easily supplied, whereby the producing of the distortion cannot be inhibited satisfactorily.

In the above-described optical modeling method, if pixels that were not exposed at the initial stage of the exposure are exposed, it is preferable that the unexposed pixels are exposed such that neighboring pixels exceeding the predetermined number are not exposed at one time. By exposing the unexposed pixels at the initial stage of the exposure such that the neighboring pixels exceeding the predetermined number are not exposed at one time, even during the second exposure processing, distortion is further inhibited from being produced at the object to be optically modeled without spreading to the pixels that were not exposed at one time, whereby optical modeling with higher accuracy is made possible. Further, in this case, it is also preferable that the number of the neighboring pixels less than the predetermined number is at least 75% or less in the total number of the pixels incorporated in the exposure region.

BRIEF DESCRIPTION OF THE DRAWINGS

FIG. 12 is a plan view illustrating another example of the exposure pattern of the exposure region;

DETAILED DESCRIPTION OF THE PREFERRED EMBODIMENTS

With reference to the drawings, preferable embodiments of an optical modeling method of the present invention will now be described.

First Embodiment

In a first embodiment of the present invention, an exposure region on a surface of a photo-curable resin layer is divided into a plurality of pixels. The plurality of the pixels is exposed such that two neighboring pixels or more are not exposed at one time. Thereafter, unexposed pixels are exposed such that two neighboring pixels or more are not exposed at one time. By exposing the resin twice, the photo-curable resin is cured in an amount of one layer so that a plate-shaped object to be optically modeled is obtained.

Figure 1:
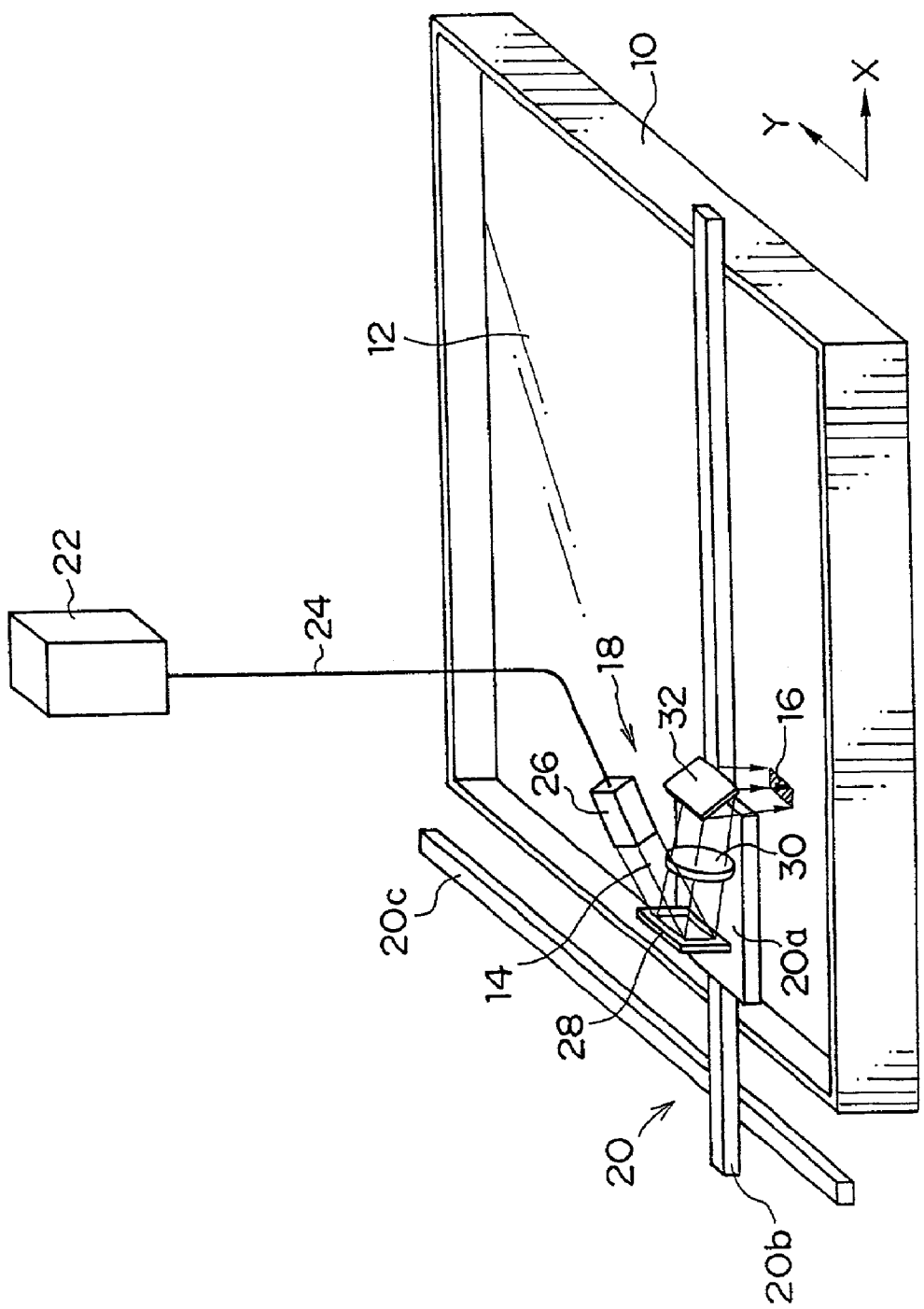
FIG. 1 is a schematic structural perspective view of an optical modeling device used for an optical modeling method according to a first embodiment of the present invention.

A description of an example of an optical modeling device for carrying out the optical modeling method according to the present embodiment will be given, hereinafter. As shown in FIG. 1, the optical modeling device comprises a container 10 which is opened at the upper portion thereof and which contains therein a liquid type photo-curable resin 12. An exposure unit 18, which exposes a region 16 having a predetermined area and including a plurality of pixels on a resin surface with a light beam 14, is disposed above the surface of the photo-curable resin 12 contained in the container 10. The exposure unit 18 is made movable in a horizontal direction (XY direction) of the resin surface by an XY positioning mechanism 20. Further, a modeling table (not shown) which can be sunk gradually is disposed in the vicinity of the liquid surface of the photo-curable resin.

The XY positioning mechanism 20 comprises a base 20a for securing the exposure unit 18 thereto, a support 20b for supporting the base 20a movably in X direction, and a support 20c for supporting the support 20b, and the base 20a movably in the Y direction. The base 20a is slidably moved on the support 20b in the X direction, the exposure unit 18 is moved in the X direction, and a position of the exposure unit 18 in the X direction is determined. The support 20b is slidably moved on the support 20c in the Y direction, the exposure unit 18 is moved in Y direction, and a position of the exposure unit 18 in the Y direction is determined. As a mechanism for sliding the base 20a and the support 20b, a lack and pinion, a ball screw, or the like can be used.

Figure 2:
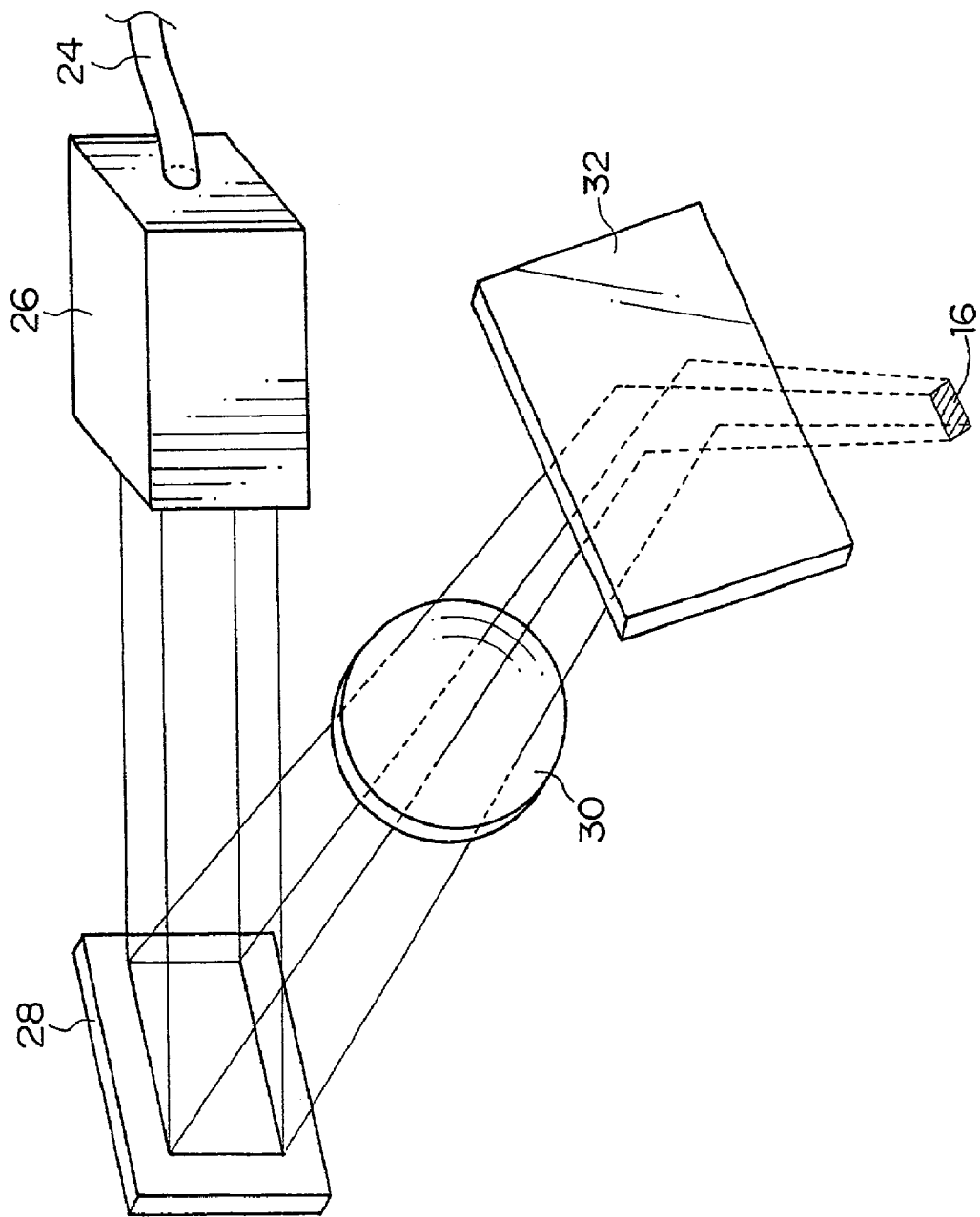
FIG. 2 is a partially enlarged structural view of an exposure unit of the optical modeling method shown in FIG. 1.

As shown in FIGS. 1 and 2, the exposure unit 18 comprises: a homogenizer 26 as an arranging optical system which makes parallel the light beams 14 which are incident from a UV light source 22 whose power is about 1 W through an optical fiber 24 whose core diameter is about 50 to 200 $\mu$m, for example, and which arranges waveforms of the light beams 14 and converts intensity distribution of light within an area which is vertical to the optical axis, to a rectangular shape; and a digital micromirror device (DMD) 28 for modulating the light beams which are emitted from the homogenizer 26 and incident thereon, for each pixel in accordance with image data of about a million pixels, for example; a condensing lens 30 for condensing the light beams which are emitted from the DMD 28; and a reflective mirror 32, fixedly disposed, for reflecting the light beams transmitted through the condensing lens 30 toward the surface of the photo-curable resin 12. Further, the XY positioning mechanism 20, the UV light source 22, and the DMD 28 are connected to a controller (not shown) for controlling the same.

Examples of the UV light source 22 include:
(1) A gallium nitride semiconductor laser;
(2) A gallium nitride semiconductor laser having a broad area light-emitting region;
(3) A semiconductor laser excitation solid laser in which a laser beam caused by excitation of a solid laser crystal by the gallium nitride semiconductor laser is wavelength-converted by an optical wavelength-converting element, and emitted;
(4) A fiber laser in which a laser beam caused by excitation of a fiber by the gallium nitride semiconductor laser is wavelength-converted by the optical wavelength-converting element, and emitted; and
(5) Any one from the aforementioned laser light sources of (1) to (4), or a UV light source comprising a lamp light source and a multiplexing optical system.

Figure 3:
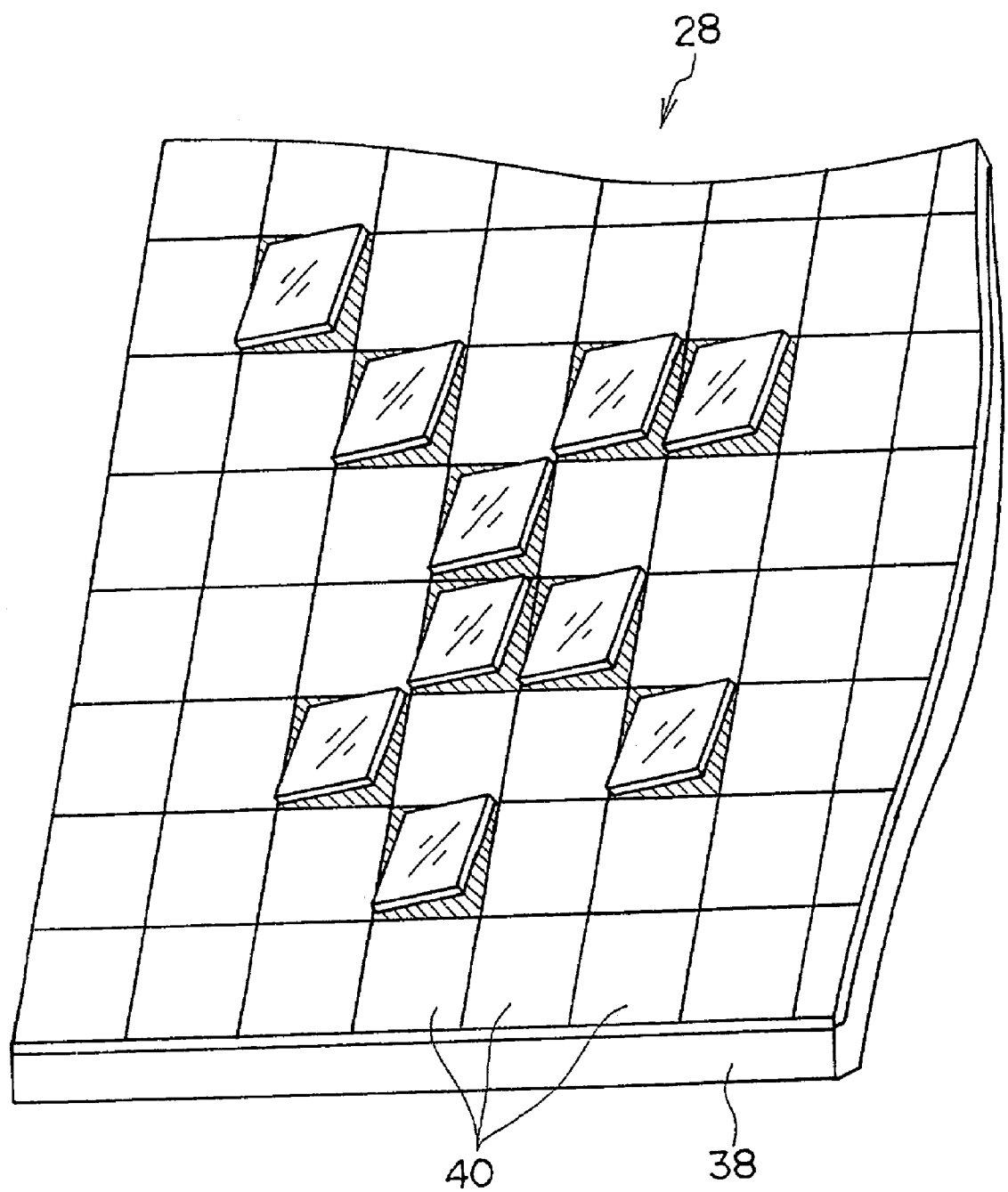
FIG. 3 is a partially enlarged structural view of a DMD.

As shown in FIG. 3, the DMD28 is a mirror device in which fine mirrors (micromirrors) 40, which are supported by a support, are disposed on an SRAM cell (memory cell) 38, and a plurality of fine mirrors (comprising several hundred thousands to several millions and corresponding to one pixel) are arranged in a lattice state. Each pixel has one micromirror 40 on top thereof, which is supported by the support, and aluminum is deposited on the surface of the micromirror 40. The reflectance of the micromirror 40 is 90% or more. A silicon gate CMOS-SRAM cell 38, which is manufactured on a manufacturing line of an ordinary semiconductor memory, is disposed directly beneath the micromirror 40, through a support including a hinge and a yoke, and the entire body is formed monolithically (in one piece).

Figure 4A:
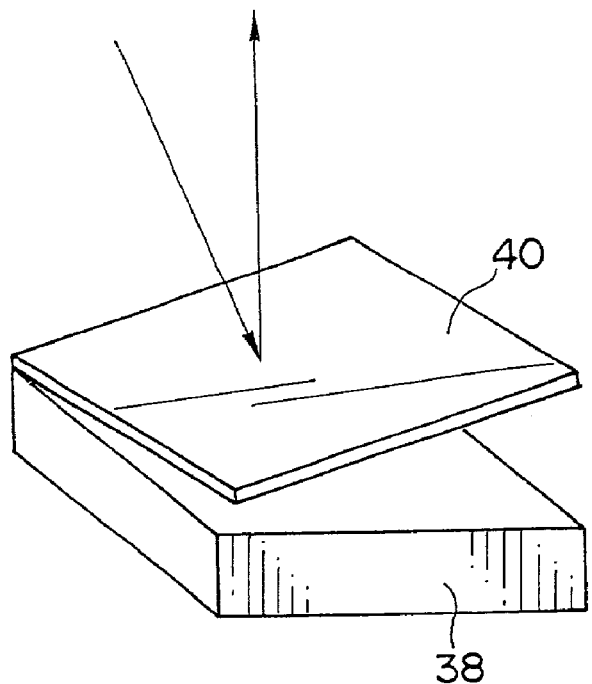
FIG. 4A is a view for explaining an operation of the DMD.
Figure 4B:
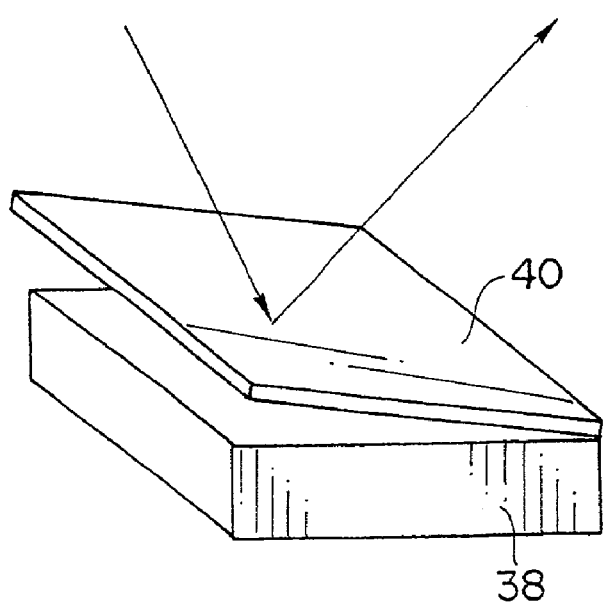
FIG. 4B is a view for explaining the operation of the DMD.

When a digital signal is written into the SRAM cell 38 of the DMD28, each micromirror 40 supported by the support is inclined within a range of $\pm\alpha°$ (e.g. $\pm10°$) with respect to the substrate side at which the DMD 28 is disposed, with a diagonal line as the central axis. FIG. 4A shows an on-state in which the micromirror 40 is inclines at $+\alpha°$. FIG. 4B shows an off-state in which the micromirror 40 inclines at $-\alpha°$. Therefore, as shown in FIG. 3, inclination of the micromirror 40 with respect to each pixel of the DMD 28 is controlled in accordance with an image signal, whereby light incident on the DMD 28 is reflected in the direction in which the micromirror 40 is inclined. Moreover, FIG. 3 shows a state of an example in which a portion of the DMD 28 is enlarged and the micromirror 40 is controlled to be angled at $+\alpha°$ or $-\alpha°$. Each micromirror 40 is switched on/off by a controller (not shown) connected to the DMD 28. Moreover, a light absorber (not shown) is disposed in a direction in which light beams are reflected from the micromirrors 40 in an off-state.

In the aforementioned optical modeling device, when a spot diameter (pixel diameter) of the light beam on the surface of the photo-curable resin 12 is 50 $\mu$m, if the exposure unit 18 equipped with the DMD 28 comprising one million (1000×1000) pixels is used, the exposure region 16 having an area (50 mm×50 mm) can be exposed at one time. Namely, the exposure region 16 is an exposable region that can be exposed by the exposure unit 18 at one time.

Next, a description of an optical modeling method using the above-described optical modeling device will be made.

Figure 5A:
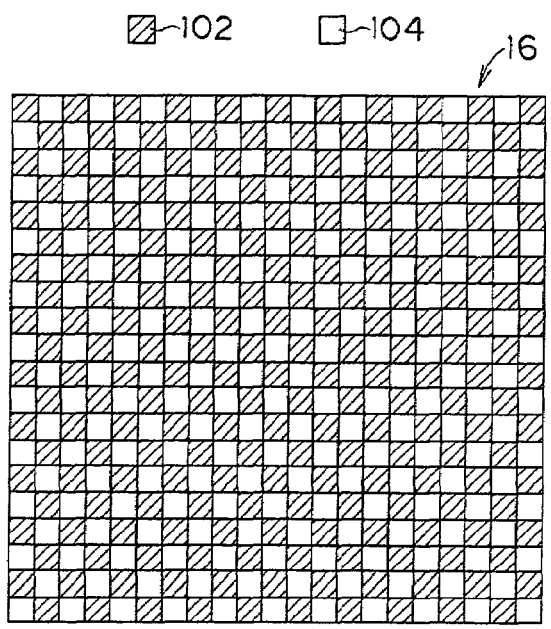
FIG. 5A is a plan view illustrating an example of an exposure pattern of an exposure region.

As shown in FIG. 5A, the exposure region 16 is divided into a plurality of pixels. The pixels are divided into a first group comprising pixels 102 that do not neighbor each other and a second group comprising pixels 104 that do not neighbor each other. FIG. 5A illustrates a portion of the exposure regions 16. However, if the exposure unit 18 that is equipped with the DMD 28 comprising one million pixels, for example, is used, the exposure region 16 is divided into one million pixels.

The pixels 102 and the pixels 104 are alternately arranged so as to form checkers. Image data, which corresponds to the exposure region 16 and which is inputted to the exposure unit 18, is converted to two sets of image data comprising first image data for exposing the pixels 102 incorporated in the first group and second image data for exposing the pixels 104 incorporated in the second group.

The XY positioning mechanism 20 is driven by the controller (not shown), the exposure unit 18 is moved in both the X and Y directions, and a position of the exposure unit 18 in the X and Y directions is determined. When the position of the exposure unit 18 is determined, a light beam is emitted from the UV light source 22, and the first image data in the exposure region 16 is transmitted to the controller (not shown) of the DMD 28. The micromirror 40 of the DMD 28 is switched on/off in accordance with the image data received.

Figure 5B:
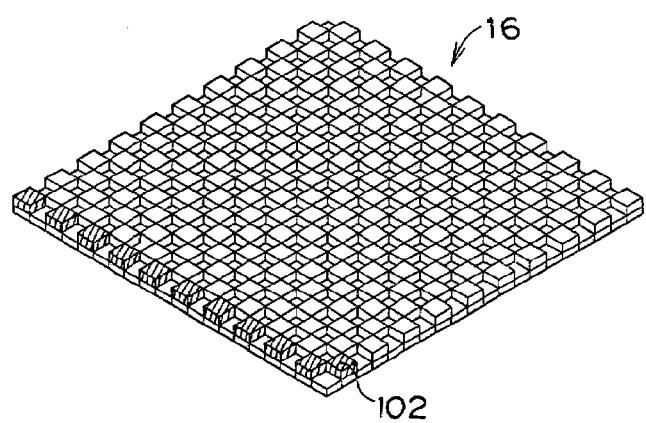
FIG. 5B is a perspective view illustrating a state after pixels 102 of FIG. 5A have been exposed.

The light beams 14 emitted from the UV light source 22 enter the homogenizer 26 through the optical fiber 24 and are made parallel by the homogenizer 26. The light beams 14, whose waveforms are arranged and whose intensity distribution within an area vertical to the optical axis is converted to a rectangular shape, enters the DMD 28. The light beam 14, which is emitted from the homogenizer 26 and incident on the micromirror 40, is reflected by the micromirror 40 both in a direction of the reflective mirror 32 in the on-state of the micromirror 40 of the DMD28 and in a direction of the light absorber (not shown) in the off-state of the micromirror 40. Namely, the light beam 14, which is incident on the DMD 28, is modulated for each pixel in accordance with image data. The condensing lens 30 condenses the light beam 14 that is reflected towards the reflective mirror 32, and the reflective mirror 32 reflects the condensed light beam 14 toward the surface of the photo-curable resin 12. Accordingly, as shown in FIG. 5B, the pixels 102 incorporated in the first group of the exposure region 16 are exposed with the light beams 14 and cured.

Figure 5C:
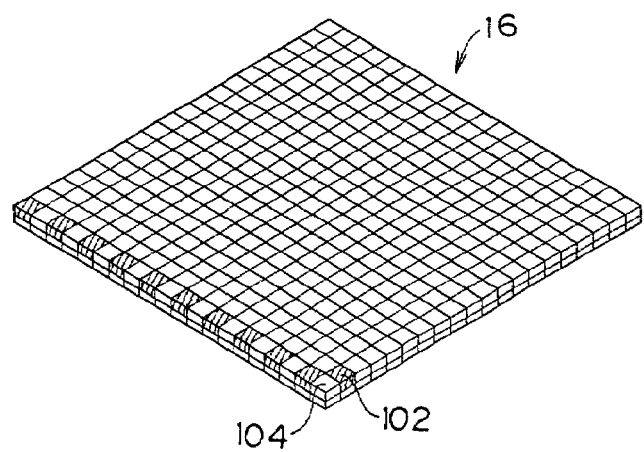
FIG. 5C is a perspective view illustrating a state after pixels 104 of FIG. 5A have been exposed.

The second image data of the exposure region 16 is transmitted to the controller (not shown) of the DMD 28, and the micromirror 40 of the DMD 28 is switched on/off in accordance with the second image data received. As shown in FIG. 5C, the image pixels 104 incorporated in the second group are exposed with the light beam 14 and cured, gaps among the pixels are filled up, and the curing of the resin at the exposure region 16 is finished. Further, a pixel diameter as a minimum unit is generally about 25 $\mu$m to 50 $\mu$m (about $6.25 \times 10^{-4}$ mm$^2$ to $25.0 \times 10^{-4}$ mm$^2$ if it is converted into areas), and a spacing between two pixels adjacent to each other and incorporated in the same group is generally about 25 $\mu$m to 50 $\mu$m.

Then, the XY positioning mechanism 20 is driven by the controller (not shown), the exposure unit 18 is moved in the directions of X and Y, the next (second) position of the exposure unit 18 in the X and Y directions is determined, and a predetermined portion of the region 16 is exposed in a manner similar to the above description. Movement of/exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the first layer. Sinking of/exposure by the modeling table is repeated several times, and a plate-shaped object to be optically modeled can be obtained.

As described above, in the optical modeling method according to the present embodiment, the pixels in the first group to be exposed at one time during the first exposure processing do not neighbor each other, and the pixels in the second group pixels to be exposed at one time during the second exposure processing do not neighbor each other. In this way, since pixels neighboring each other in the exposure region are not exposed at one time, distortion due to curing shrinkage does not spread to the pixels neighboring each other. Namely, in a conventional optical modeling method in which the entire exposure region is exposed at one time, distortion due to the curing shrinkage becomes larger as the distortion spreads within the exposure region, whereby a considerable amount of distortion is produced in the resin. However, in the optical modeling method according to the present embodiment, since the occurring of curing shrinkage is limited to one pixel, distortion due to the curing shrinkage does not spread to pixels neighboring the one pixel. Further, since pixels which were cured during the first exposure processing are surrounded by uncured resin at the peripheries thereof, the uncured resin is supplied into shrunk portions of the pixels which were cured during the first exposure processing, whereby the producing of distortion at portions of the pixels which were cured during the first exposure processing can be controlled. Consequently, the producing of distortion in the object to be optically modeled can be inhibited a great deal, and optical modeling with higher precision is made possible.

Since a predetermined exposure region is exposed at one time by using the exposure unit equipped with the DMD, modeling at high speed is made possible.

In the present embodiment, pixels are entirely exposed such that two neighboring pixels or more are not exposed. However, since an area for each pixel is about $6.25 \times 10^{-4}$ mm$^2$ to $25.0 \times 10^{-4}$ mm$^2$, the producing of distortion can be inhibited significantly. Further, a spacing between two neighboring pixels incorporated in the same group is generally about from 25 $\mu$m to 50 $\mu$m, which facilitates uncured resin to be supplied from the unexposed region into the region that has been exposed at the initial stage of the exposure, whereby distortion due to the curing shrinkage can be inhibited.

Second Embodiment

In a second embodiment of the present invention, the exposure region is divided into a plurality of pixels. The plurality of the pixels are exposed such that three neighboring pixels or more are not exposed at one time. Thereafter, unexposed pixels are exposed such that three neighboring pixels or more are not exposed at one time. By exposing the photo-curable resin twice, the resin is cured by an amount of one layer so that a plate-shaped object to be optically modeled is obtained. Further, the optical modeling device that is the same as that in the first embodiment of the present invention is also used in the present embodiment.

Figure 6:
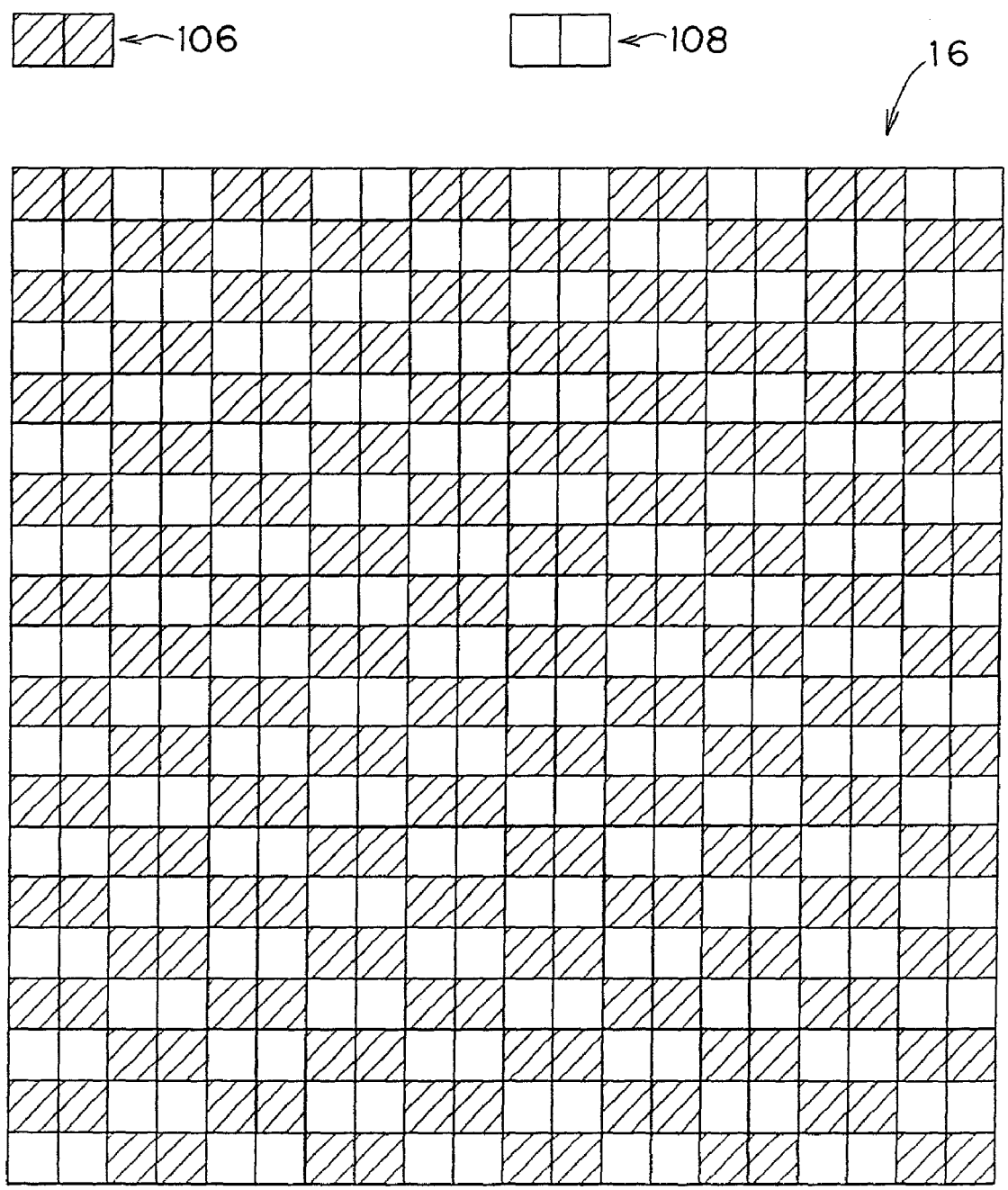
FIG. 6 is a plan view illustrating another example of the exposure pattern of the exposure region.

As shown in FIG. 6, the exposure region 16 is divided into a plurality of pixels. The plurality of the pixels are divided into a first group comprising pixel sub-groups 106 each having two pixels neighboring in one direction, and a second group comprising pixel sub-groups 108 each having two pixels neighboring in the same direction as the one direction. FIG. 6 shows a portion of the exposure region 16. However, if the exposure unit 18 having the DMD 28 comprising one million pixels, for example, is used, the exposure region 16 is divided into one million pixels.

The pixel sub-groups 106 and the pixel sub-groups 108 are arranged in checkers and alternately such that pixel sub-groups incorporated in the same group do not neighbor each other. Image data corresponding to the exposure region 16 and inputted to the exposure unit 18 is converted to two sets of image data comprising first image data for exposing the pixel sub-groups 106 in the first group and second image data for exposing the pixel sub-groups 108 in the second group.

In the same manner as in the first embodiment of the present invention, on the basis of the first image data, the pixel sub-groups 106 in the first group of the exposure region 16 are exposed with the light beams 14, and cured. Next, on the basis of the second image data, the pixel sub-groups 108 in the second group of the exposure region 16 are exposed with the light beams 14 and cured, and gaps between the pixel sub-groups 106 and the pixel sub-groups 108 are filled up, whereby the curing of resin in the exposure region 16 is completed. Further, since a pixel diameter as a minimum unit is generally about 25 $\mu$m to 50 $\mu$m, each pixel sub-group has an area of about $12.5 \times 10^{-4}$ mm$^2$ to $50.0 \times 10^{-4}$ mm$^2$, and a spacing between two neighboring pixel sub-groups incorporated in the same group is generally 25 $\mu$m to 1 mm.

Then, the XY positioning mechanism 20 is driven by the controller (not shown), the exposure unit 18 is moved in the directions of X and Y, the next (second) position of the exposure unit 18 in the X and Y directions is determined, and a predetermined portion of the region 16 is exposed in a manner similar to the above description. This movement of exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the first layer. Sinking of/exposure by the modeling table is repeated several times, and a plate-shaped object to be optically modeled can be obtained.

As described above, in the optical modeling method according to the present embodiment, pixel sub-groups in the first group to be exposed at one time in the first exposure processing do not neighbor each other, and pixel sub-groups in the second group to be exposed at one time at the second exposure processing do not neighbor each other. In this way, since neighboring pixel sub-groups are not exposed at one time, distortion due to the curing shrinkage does not spread to the neighboring pixel sub-groups. Namely, if the entire exposure region is exposed at one time, distortion due to the curing shrinkage becomes larger as the distortion spreads within the exposure region, whereby a considerable amount of distortion may be produced on the resin. However, in the present embodiment, the producing of curing shrinkage is limited to one pixel sub-group, whereby distortion due to the curing shrinkage does not spread to pixel sub-groups neighboring the one pixel sub-group. Further, since the pixel sub-group which was cured during the first exposure processing is surrounded by uncured resin, the uncured resin is supplied into shrunk portions of the pixel sub-group which was cured during the first exposure processing, whereby distortion is inhibited. Consequently, distortion in the object to be optically modeled can be inhibited significantly so that modeling with higher precision is made possible.

Since the exposure unit equipped with the DMD exposes a predetermined area of the exposure region at one time, high-speed modeling is made possible.

Further, in the present embodiment, pixels are entirely exposed such that three neighboring pixels or more are not exposed at one time. However, each pixel sub-group has a small area of about $12.5 \times 10^{-4}$ mm$^2$ to $50.0 \times 10^{-4}$ mm$^2$, whereby the producing of distortion can be inhibited significantly. A spacing between two neighboring pixels incorporated in the same group is generally about 25 μm to 50 μm, which is large enough for facilitating uncured resin to be supplied from the unexposed region into the region that was exposed at the initial stage of the exposure, whereby the producing of distortion can be inhibited significantly.

Figure 7:
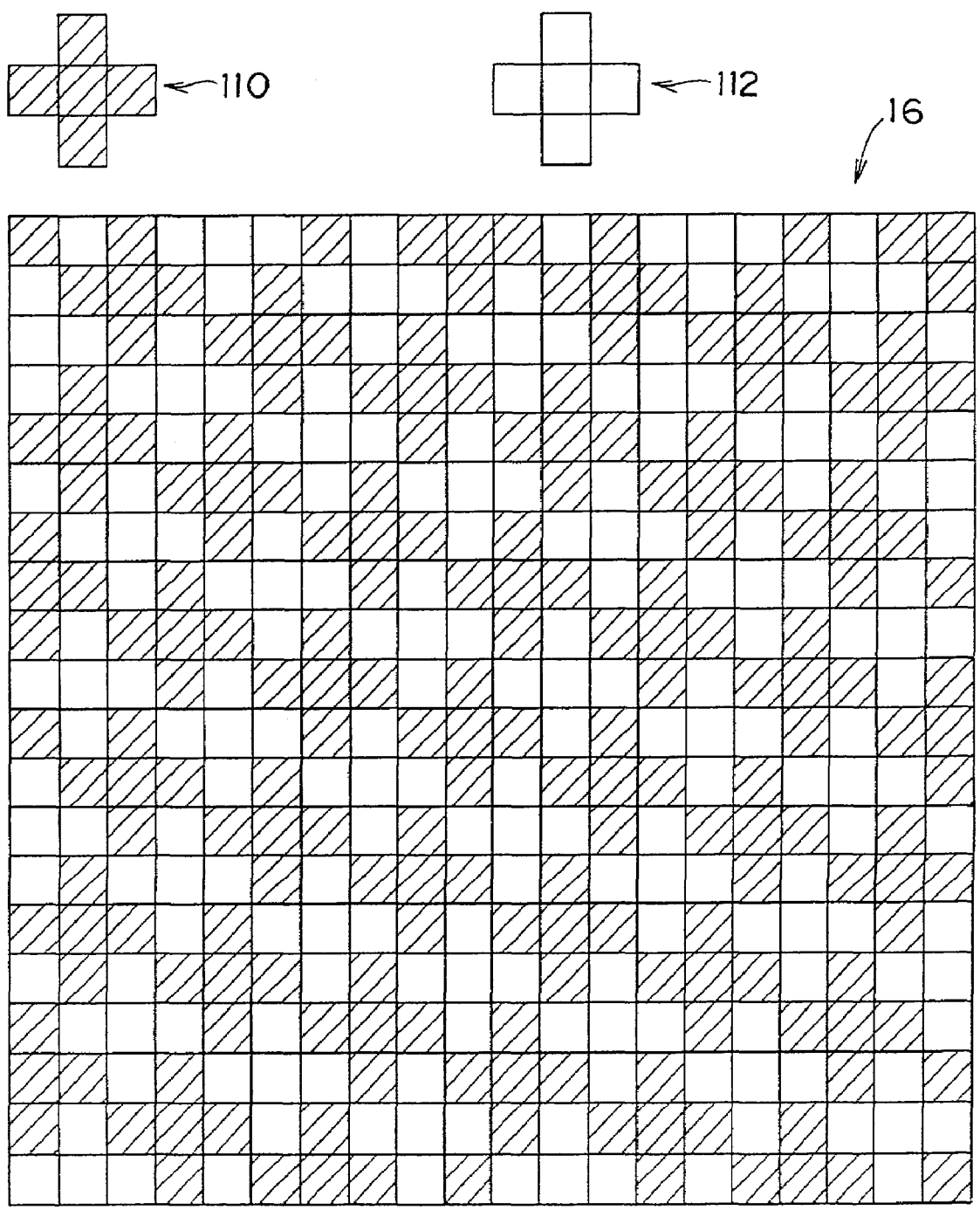
FIG. 7 is a plan view illustrating another example of the exposure pattern of the exposure region.

In the above-described second embodiment of the present invention, a description of an example in which each pixel sub-group comprises two pixels has been given. However, each pixel sub-group can comprise three pixels or more. Further, the configuration of the pixel sub-group is not limited to a square or a rectangular, but can be a polygon or a combination of polygons. For example, as shown in FIG. 7, the exposure region 16 can be divided into a plurality of pixels. The plurality of the pixels can be divided into two groups comprising a first group that comprises dodecagon-shaped pixel sub-groups 110 each comprising five pixels of a central pixel and four neighboring pixels surrounding the central pixel, and a second group that comprises pixel sub-groups 112 each similarly comprising five pixels of a central pixel and four neighboring pixels surrounding the central pixel, and then exposed. Also in this case, since the pixel sub-groups 110 and the pixel sub-groups 112 are alternately arranged such that pixel sub-groups incorporated in the same group do not neighbor each other, neighboring pixel sub-groups are not exposed at one time, curing shrinkage is produced only within a range of each pixel sub-group, whereby distortion due to the curing shrinkage does not spread to the pixel sub-groups neighboring the each pixel sub-group. Further, since the pixel sub-group that was cured during the first exposure processing is surrounded by uncured resin, the uncured resin is supplied into shrunk portions of the pixel sub-group that was cured during the first exposure processing, whereby distortion can be inhibited.

Figure 8:
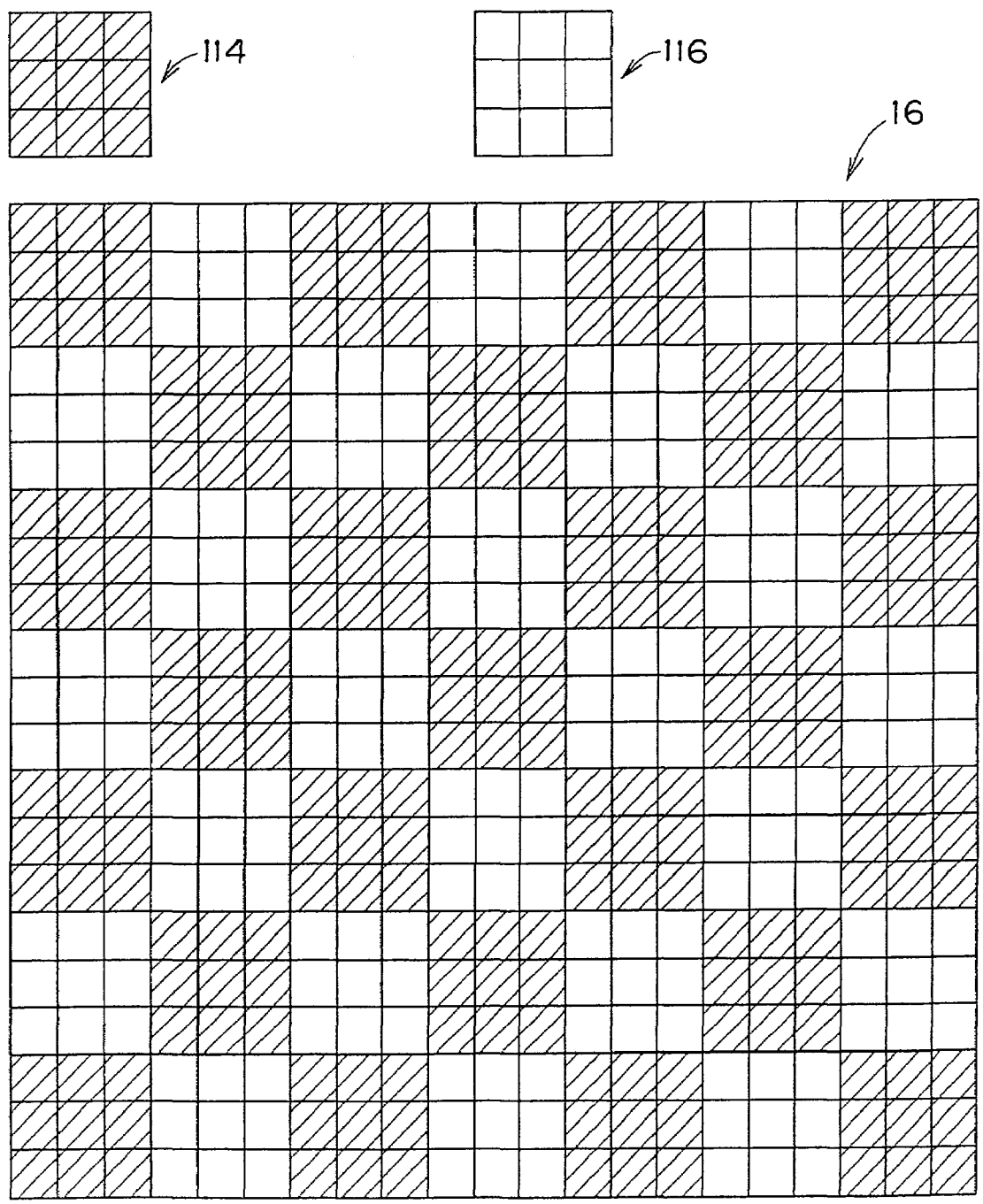
FIG. 8 is a plan view illustrating another example of the exposure pattern of the exposure region.

As shown in FIG. 8, the exposure region 16 is divided into a plurality of pixels. The plurality of the pixels are divided into a first group comprising pixel sub-groups 14 each formed by nine pixels comprising a central pixel, and eight neighboring pixels surrounding the central pixel, and a second group comprising pixel sub-groups 116 each formed similarly by nine pixels comprising a central pixel, and eight neighboring pixels surrounding the central pixel, and exposed. Also in this case, since the pixel sub-groups 114 and the pixel sub-groups 116 are alternately arranged such that pixel sub-groups incorporated in the same group do not neighbor each other, pixel sub-groups neighboring each other are not exposed at one time, and curing shrinkage is produced only within a range of each pixel sub-group, whereby distortion due to the curing shrinkage does not spread to pixel sub-groups neighboring the each pixel sub-group. Further, since the pixel sub-group that was cured during the first exposure processing is surrounded by uncured resin, the uncured resin is supplied into shrunk portions of the pixel sub-group that was cured during the first exposure processing, and distortion can thereby be inhibited.

Figure 9:
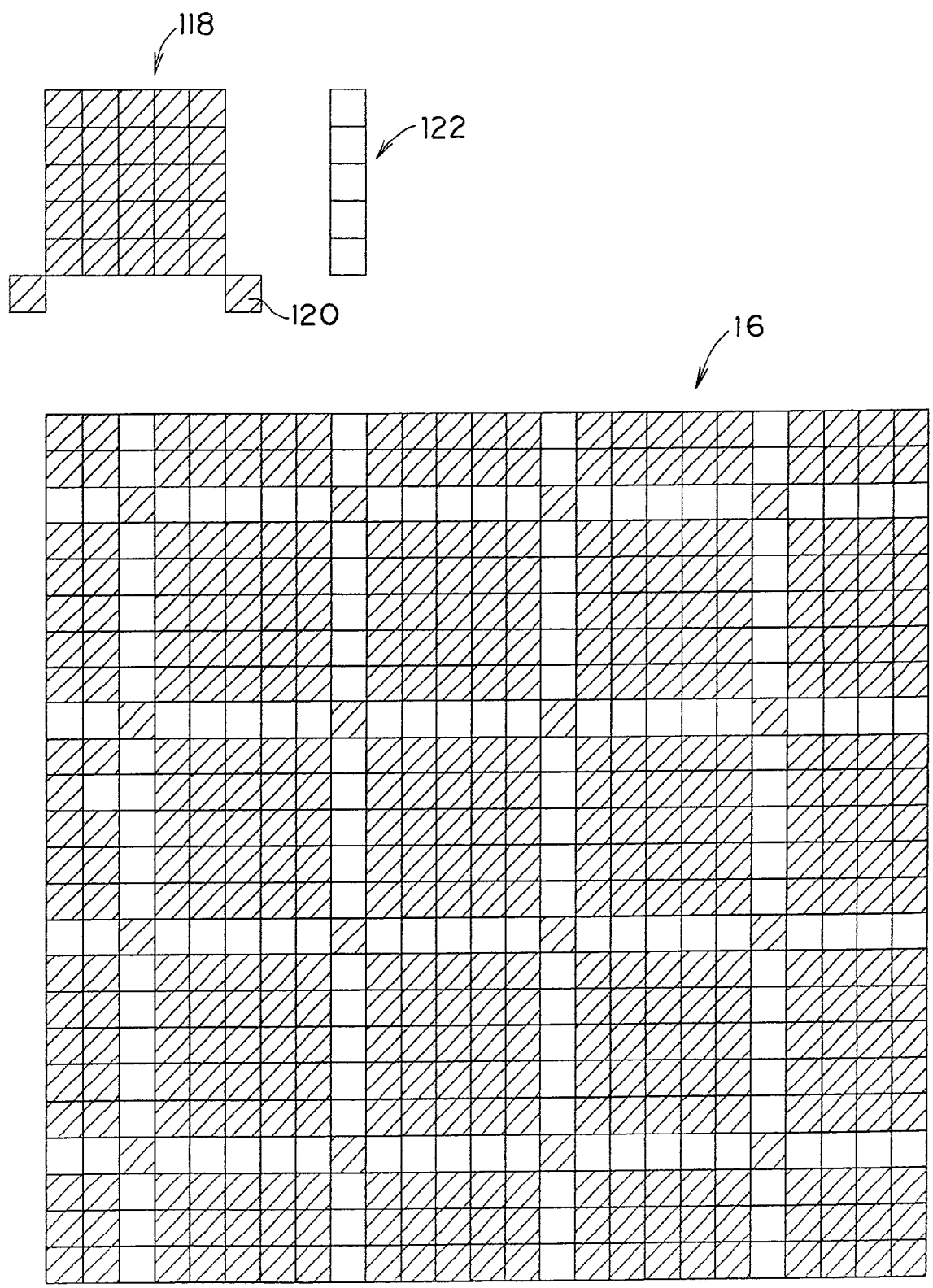
FIG. 9 is a plan view illustrating another example of the exposure pattern of the exposure region.

In the above-described second embodiment of the present invention, description of an example in which each of the pixel sub-groups incorporated in two groups is formed into the same configuration has been made. However, the pixel sub-groups in two groups need not be formed into the same configuration, and instead, can be formed in different configurations. For example, as shown in FIG. 9, the exposure region 16 can be divided into a plurality of pixels. The plurality of the pixels are divided into pixel sub-groups 118 each comprising 25 (5×5) neighboring pixels, pixels 120 that do not neighbor the pixel sub-groups 118, and pixel sub-groups 122 comprising 5 pixels in a row. Namely, the plurality of the pixels can be divided into a first group comprising the pixel sub-groups 118 and the pixels 120, and a second group comprising the pixel sub-groups 122, and then exposed.

In this case, since the pixel sub-groups 118 or the pixel sub-groups 118 and the pixels 120, which are incorporated in the first group, to be exposed at one time at the first exposure processing are arranged alternately without neighboring each other, the pixel sub-groups 118 and the pixels 120 neighboring each other are not exposed at one time, and curing shrinkage is produced only within a range of each of the pixel sub-groups 118 or the pixels 120, whereby distortion due to the curing shrinkage does not spread onto the pixel sub-groups 118 and the pixels 120 neighboring each other. Further, since the pixel sub-groups that were cured during the first exposure processing are surrounded by uncured resin, the uncured resin is supplied into shrunk portions of the pixel sub-groups that were cured during the first exposure processing, whereby distortion can be inhibited.

Third Embodiment

In a third embodiment of the present invention, the exposure region is divided into a plurality of pixels. The plurality of the pixels are exposed such that 26 neighboring pixels or more are not exposed at one time (namely, 25 pixels (i.e., 5×5=25) are exposed at one time). Thereafter, unexposed pixels are exposed at one time, and by exposing the resin twice, the photo-curable resin is cured in an amount of one layer, whereby a plate-shaped object to be optically modeled is obtained. Further, also in the third embodiment of the present invention, the optical modeling device which is the same as that in the first embodiment of the present invention, is used.

Figure 10:
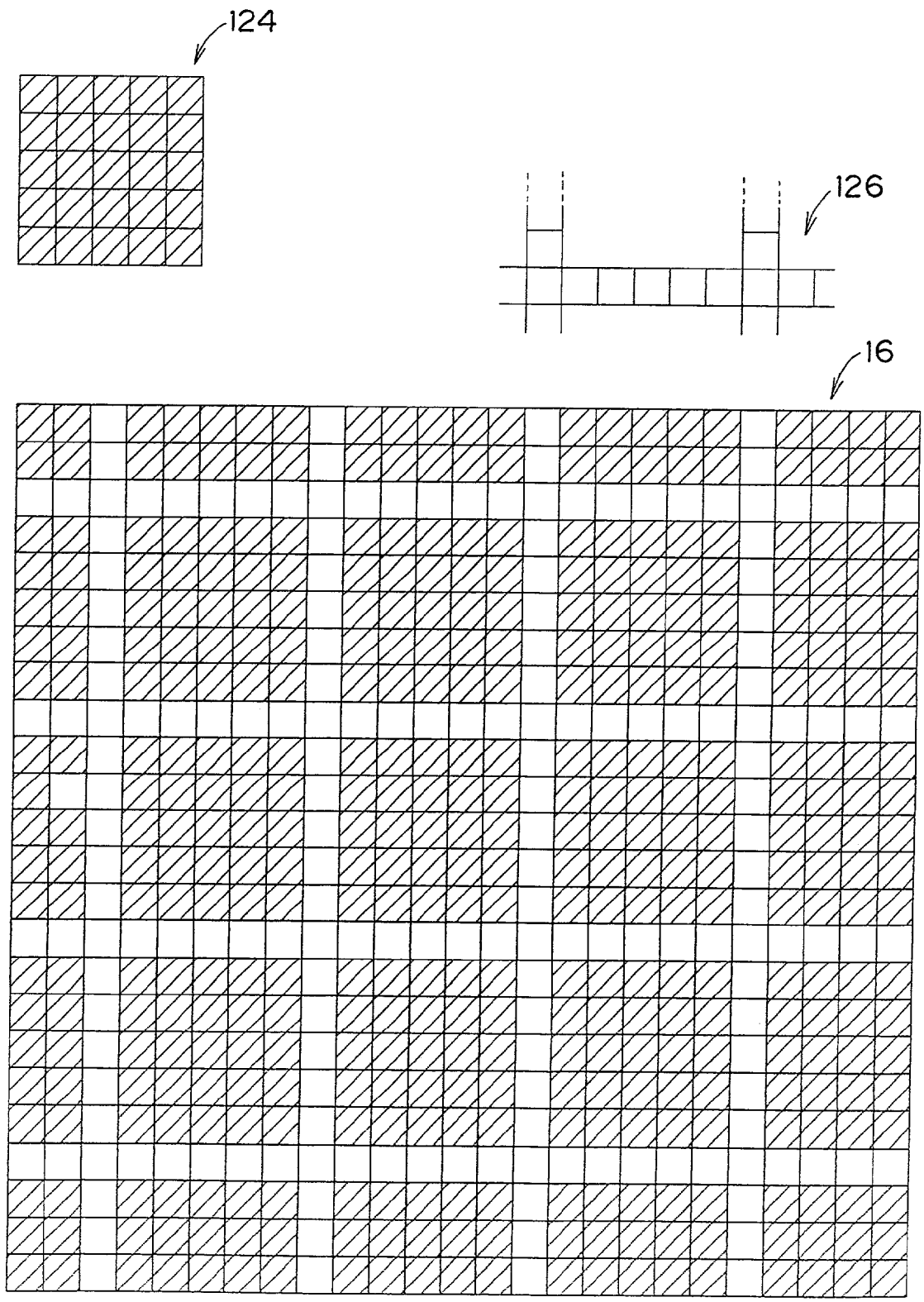
FIG. 10 is a plan view illustrating another example of the exposure pattern of the exposure region.

As shown in FIG. 10, the exposure region 16 is divided into a plurality of pixels. The plurality of the pixels are further divided into a first group formed by pixel sub-groups 124 comprising 25(5×5) neighboring pixels and a second group formed by a single pixel sub-group 126 comprising the entire remaining pixels neighboring each other. The pixel sub-groups 124 are arranged in a lattice so as not to neighbor each other. FIG. 10 shows a portion of the exposure region 16. However, if the exposure unit 18 equipped with the DMD 28 comprising one million (1000×1000) pixels is used, the exposure region 16 is divided into one million pixels.

Image data corresponding to the exposure region 16 and inputted to the exposure unit 18 is converted to two sets of image data comprising first image data for exposing the pixel sub-groups 124 incorporated in a first group and second image data for exposing the pixel sub-groups 126 incorporated in a second group.

In the same manner as the first embodiment of the present invention, on the basis of the first image data, the pixel sub-groups 124 incorporated in the first group of the exposure region 16 are exposed with the light beams 14, and cured. Next, on the basis of the second image data, the pixel sub-groups 126 incorporated in the second group of the exposure region 16 are exposed with the light beams 14, and cured. Accordingly, gaps between the pixel sub-groups 124 and the pixel sub-groups 126 are filled up, whereby the curing of resin in the exposure region 16 is completed. Further, since a pixel diameter as a minimum unit is generally about 25 $\mu$m to 50 $\mu$m, each pixel sub-group has an area of about $1.56 \times 10^{-2}$ mm$^2$ to $6.25 \times 10^{-2}$ mm$^2$, and a spacing between two neighboring pixel sub-groups incorporated in the first group is generally 25 $\mu$m to 50 $\mu$m.

Then, the XY positioning mechanism 20 is driven by the controller (not shown), the exposure unit 18 is moved in the directions of X and Y, the next (second) position of the exposure unit 18 in the X and Y directions is determined, and a predetermined portion of the region 16 is exposed in the same manner as the above description. This movement of/exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the first layer. Sinking of/exposure by the modeling table are repeated several times, whereby a plate-shaped object to be optically modeled can be obtained.

As described above, in the optical modeling method according to the present embodiment, pixel sub-groups in the first group to be exposed at one time at the first exposure processing do not neighbor each other. The second group to be exposed at one time at the second exposure processing incorporates therein only a single pixel sub-group. In this way, since neighboring pixel sub-groups are not exposed at one time, distortion due to the curing shrinkage does not spread to the neighboring pixel sub-groups. Namely, if the entire exposure region is exposed at one time, distortion due to the curing shrinkage becomes larger as the distortion spreads within the exposure region, whereby a significant amount of distortion may be produced. However, in the present embodiment, since the curing shrinkage is produced within a range of one pixel sub-group, distortion due to the curing shrinkage does not spread to the neighboring pixel sub-groups. Further, since each of the pixel sub-groups that were cured during the first exposure processing is surrounded by uncured resin, the uncured resin is supplied into shrunk portions of the pixel sub-groups that were cured during the first exposure processing, whereby distortion is inhibited. In addition, the single pixel sub-group incorporated in the second group comprises the remaining neighboring pixels. However, since most of the exposure region has been exposed during the first exposure processing, even if the remaining neighboring pixels are exposed at one time during the second exposure processing, any significant distortion is not produced. Consequently, distortion in the object to be optically modeled can be inhibited noticeably, and modeling with higher precision is made possible.

Since the exposure unit equipped with the DMD exposes a predetermined area of the exposure region at one time, high-speed modeling is made possible.

In the present embodiment, pixels are exposed such that 26 neighboring pixels or more are not exposed at one time, namely, 25 pixels are exposed at one time. However, each pixel sub-group incorporated in the first group has an area of about $1.56 \times 10^{-2}$ mm$^2$ to $6.25 \times 10^{-2}$ mm$^2$, whereby distortion due to the curing shrinkage can be inhibited.

Figure 11:
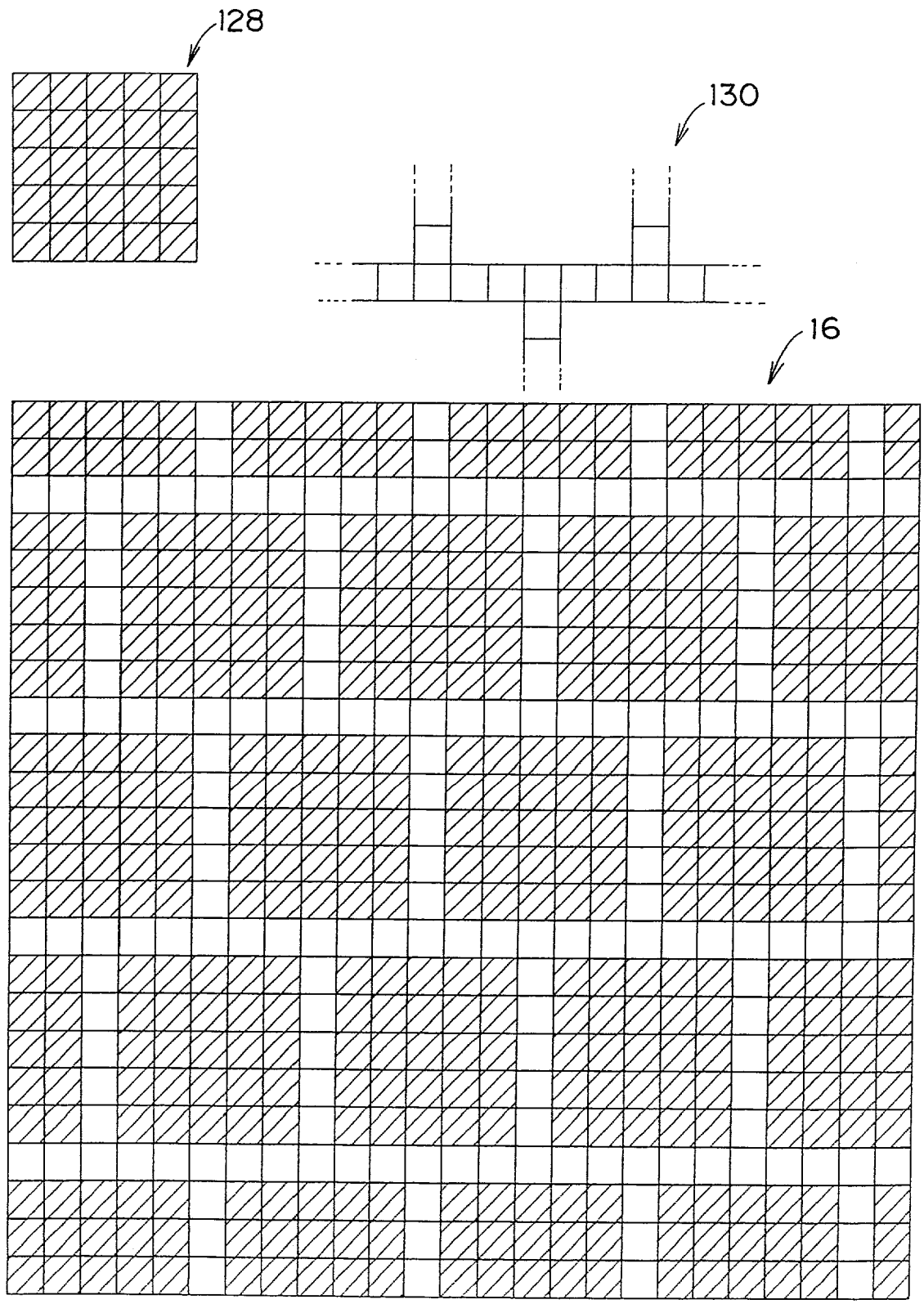
FIG. 11 is a plan view illustrating another example of the exposure pattern of the exposure region.

In the above-described third embodiment of the present invention, description of an example in which the pixel sub-groups 124 to be exposed during the first exposure processing are arranged in checkers has been given. However, for example, as shown in FIG. 11, the pixel sub-groups 124 can be arranged such that the pixel sub-groups 128 comprising 25 neighboring pixels in a row direction are shifted a half pitch in a row direction for every other column. Further, a pixel sub-group 130 is a single pixel sub-group comprising the remaining neighboring pixels.

In the above-described third embodiment of the present invention, description of an example has been made in which a pixel sub-group incorporated in the second group is a single pixel sub-group comprising the remaining neighboring pixels. However, the second group can comprise pixels that do not neighbor each other. For example, as shown in FIG. 12, the exposure region 16 is divided into a plurality of pixels. The plurality of the pixels are further divided into a first group formed by pixel sub-groups 132 comprising 13 neighboring pixels and a second group formed by pixels 134 comprising remaining and non-neighboring pixels 134. Also in this case, since the pixel sub-groups 132 incorporated in the first group to be exposed at one time during the first exposure processing are arranged in a staggered shape without neighboring each other, neighboring pixel sub-groups are not exposed at one time, and the curing shrinkage is produced within one single pixel sub-group, whereby distortion due to the curing shrinkage does not spread to pixel sub-groups neighboring the one single pixel sub-group. Further, since each of the pixel sub-groups that were cured during the first exposure processing is surrounded by uncured resin, the uncured resin is supplied into shrunk portions of the pixel sub-groups that were cured during the first exposure processing, whereby distortion is inhibited. In addition, since the pixel sub-groups 134 incorporated in the second group to be exposed at one time during the second exposure processing do not neighbor each other, the pixel sub-groups neighboring each other are not exposed at one time, and the curing shrinkage is produced within a range of the one single pixel sub-group, whereby distortion due to the curing shrinkage does not spread to pixels neighboring the one single pixel sub-group.

Fourth Embodiment

In a fourth embodiment of the present invention, the exposure region is divided into a plurality of pixels. After the plurality of the pixels have been exposed such that two neighboring pixels or more are not exposed at one time, when unexposed pixels are exposed, the unexposed pixels are allotted to two groups, and exposed for each of the two groups such that two neighboring pixels or more are not exposed at one time. By exposing the resin three times, a photo-curable resin is cured in an amount of one layer so that a plate-shaped object to be optically modeled is obtained. Further, also in the fourth embodiment of the present invention, an optical modeling device that is the same as that in the first embodiment of the present invention is used.

Figure 13:
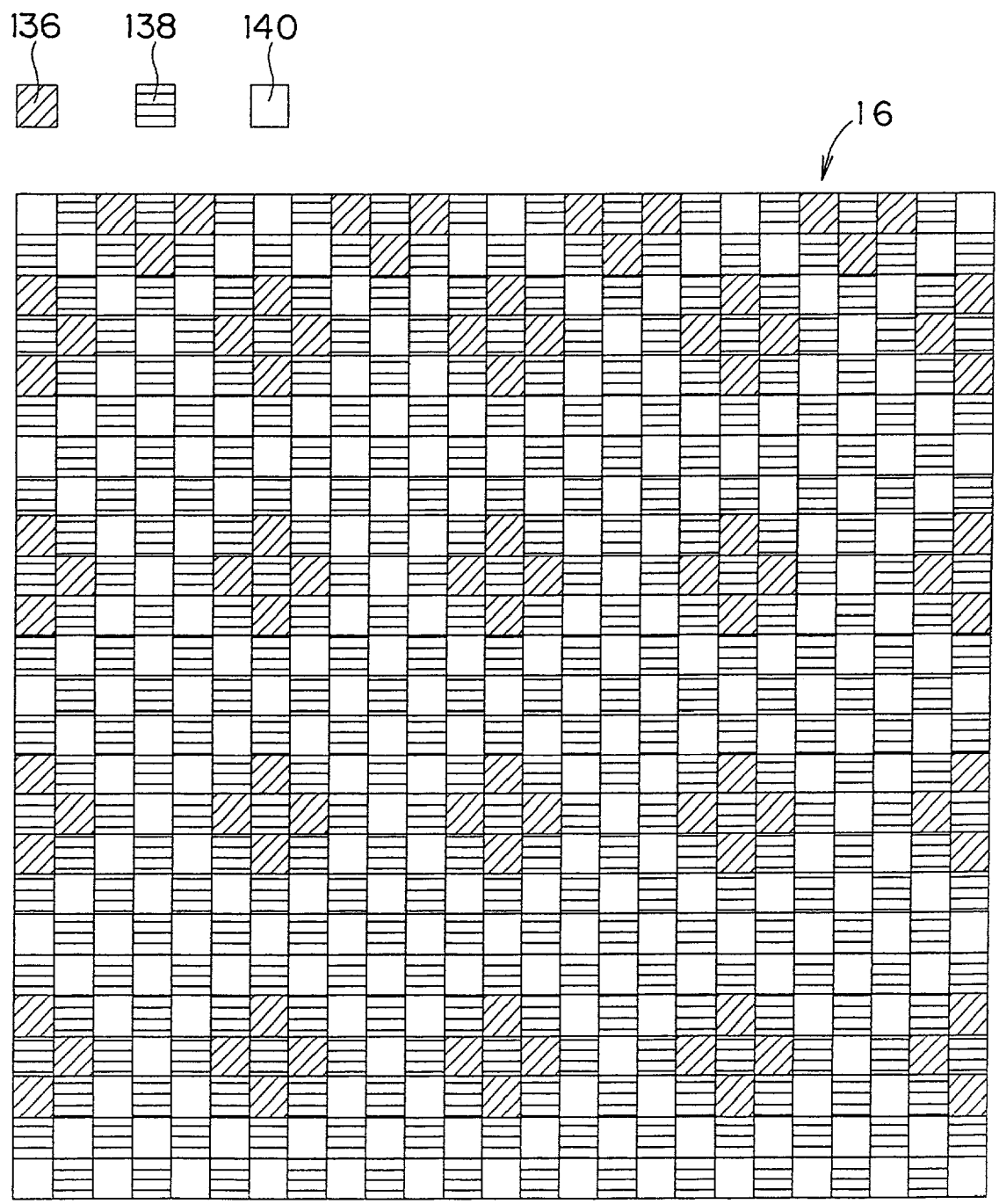
FIG. 13 is a plan view illustrating another example of the exposure pattern of the exposure region.

As shown in FIG. 13, the exposure region 16 is divided into a plurality of pixels. The plurality of the pixels are allotted to three groups comprising: a first group comprising pixels 136 that do not neighbor each other, a second group comprising pixels 138 that do not neighbor each other, and a third group comprising remaining and non-neighboring pixels 140. FIG. 13 shows a portion of the exposure region 16. If the exposure unit 18 equipped with the DMD 28 comprising one million pixels, for example, is used, the exposure region 16 is divided into one million pixels.

Image data corresponding to the exposure region 16 and inputted to the exposure unit 18 is converted to three sets of image data comprising first image data for exposing the pixel sub-groups 136 incorporated in a first group, second image data for exposing the pixel sub-groups 138 incorporated in a second group, and third image data for exposing the pixel sub-groups 140 incorporated in a third group.

In the same manner as in the first embodiment of the present invention, on the basis of the first image data, the pixels 136 incorporated in the first group of the exposure region 16 are exposed with the light beams 14, and cured. On the basis of the second image data, the pixels 138 incorporated in the second group of the exposure region 16 are exposed with the light beams 14, and cured. Then, on the basis of the third image data, the pixels 140 incorporated in the third group of the exposure region 16 are exposed with the light beams 14, and cured. Accordingly, gaps between the pixels for which the curing has been completed are filled up, whereby the curing of the photo-curable resin in the exposure region 16 will be finished. In addition, since a pixel diameter as a minimum unit is generally about 25 $\mu$m to 50 $\mu$m, each pixel sub-group has an area of about $6.25 \times 10^{-4}$ mm$^2$ to $25.0 \times 10^{-4}$ mm$^2$, and a spacing between two neighboring pixels incorporated in the same group is generally about 25 $\mu$m to 50 $\mu$m.

Then, the XY positioning mechanism 20 is driven by the controller (not shown), the exposure unit 18 is moved in directions of X and Y, the next (second) position of the exposure unit 18 in X and Y directions is determined, and a predetermined portion of the region 16 is exposed in the same manner as the above description. This movement of/exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the above description. Sinking of/exposure by the modeling table is repeated several times, whereby a plate-shaped object to be optically modeled can be obtained.

As described above, in the optical modeling method according to the present invention, pixels of the first group to be exposed at one time during the first exposure processing do not neighbor each other, pixels of the second group to be exposed at one time during the second exposure processing do not neighbor each other, either, and pixels of the third group to be exposed at one time during the third exposure processing do not neighbor each other, either. In this way, since neighboring pixels are not exposed at one time, distortion due to the curing shrinkage does not spread to the neighboring pixels. Namely, if the entire exposure region is exposed at one time, distortion due to the curing shrinkage becomes larger as the distortion spreads within the exposure region, whereby a considerable amount of distortion may be produced on the resin. However, in the present embodiment, the curing shrinkage is produced within a range of one pixel, whereby distortion due to the curing shrinkage does not spread to pixels neighboring the one pixel. Further, since the pixels which were cured during the first exposure processing are surrounded by uncured resin, the uncured resin is supplied into shrunk portions of the pixels which were cured during the first exposure processing, whereby distortion is inhibited. Moreover, the uncured resin is supplied from the unexposed portion into shrunk portions of the pixels that were cured during the first and second exposure processings, whereby distortion is inhibited. Consequently, distortion in the object to be optically modeled can be inhibited significantly, and modeling with higher precision is made possible.

Since the exposure unit equipped with the DMD exposes a predetermined area of the exposure region at one time, high-speed modeling is made possible.

Further, in the present embodiment, pixels are exposed such that two neighboring pixels or more are not exposed at one time. However, one pixel has a small area of about $6.25 \times 10^{-4}$ mm$^2$ to $25.0 \times 10^{-4}$ mm$^2$, whereby distortion can be inhibited significantly. Further, a spacing between two neighboring pixels incorporated in the same group is generally about 25 $\mu$m to 50 $\mu$m, which facilitates uncured resin to be supplied from an unexposed region into the region that was exposed at the initial stage of exposure, whereby distortion can be inhibited significantly.

Fifth Embodiment

In a fifth embodiment of the present invention, the exposure region is divided into a plurality of pixels. After the plurality of the pixels have been exposed such that two neighboring pixels or more are not exposed at one time, when unexposed pixels are exposed, the unexposed pixels are divided into two groups, and exposed for each of the two groups such that two neighboring pixels or more are not exposed at one time. Thereafter, remaining pixels are exposed, the resin is exposed for three times, and a photo-curable resin is cured in an amount of one layer, whereby a plate-shaped object to be optically modeled is obtained. Further, also in the fifth embodiment of the present invention, an optical modeling device that is the same as that in the first embodiment of the present invention is used.

Figure 14:
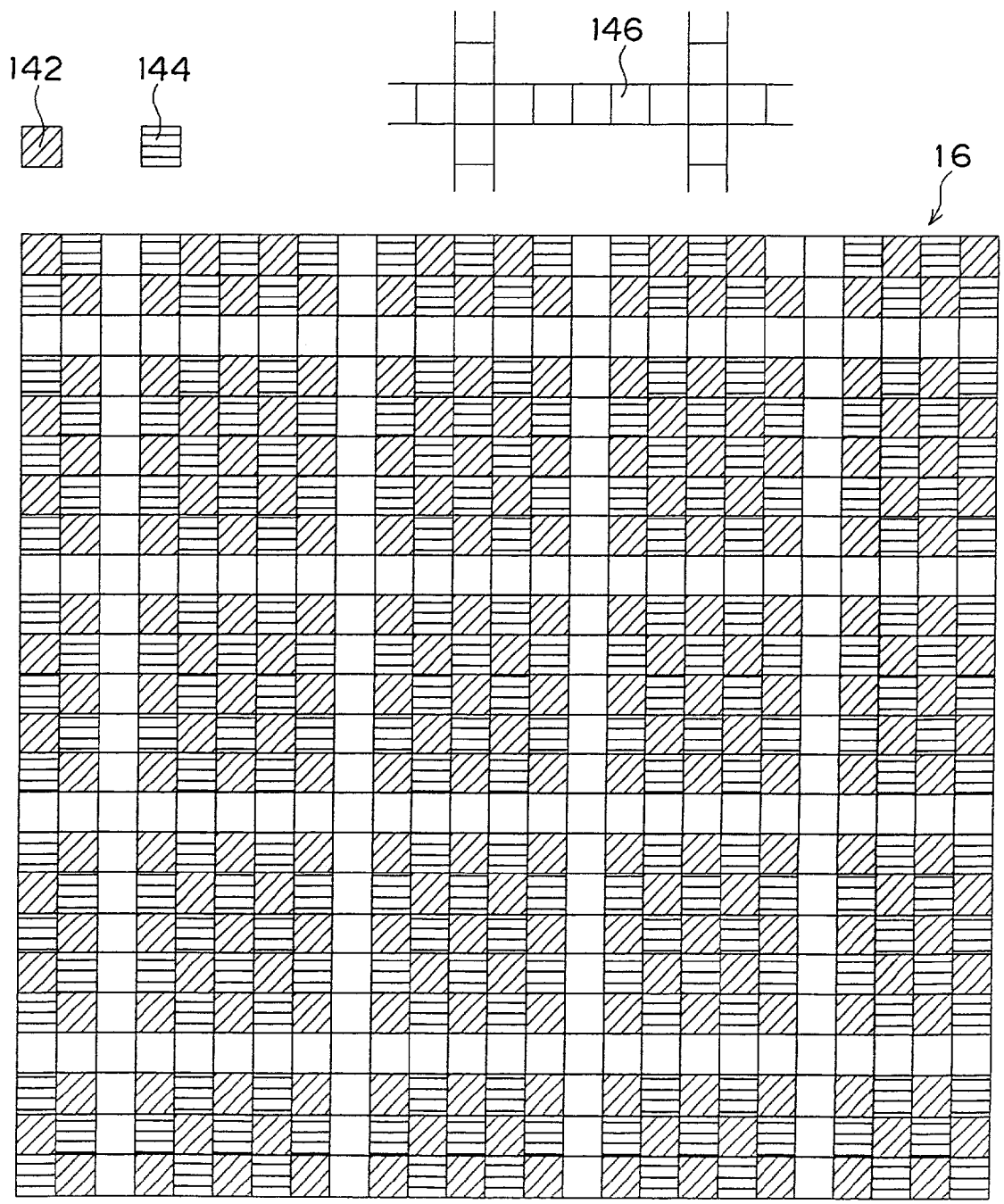
FIG. 14 is a plan view illustrating another example of the exposure pattern of the exposure region.

As shown in FIG. 14, the exposure region 16 is divided into a plurality of pixels. The plurality of the pixels are further divided into three groups including a first group comprising pixels 142 that do not neighbor each other, a second group comprising pixels 144 that do not neighbor each other, and a third group comprising a single pixel sub-group 146 formed by the remaining and neighboring pixels. FIG. 14 shows a portion of the exposure region 18. For example, if the exposure unit 18 equipped with the DMD 28 comprising one million pixels is used, the exposure region 16 is divided into one million pixels.

Image data corresponding to the exposure region 16 and inputted to the exposure unit 18 is converted to three sets of image data comprising first image data for exposing the pixels 142, second image data for exposing the pixels 144, and third image data for exposing the single pixel sub-group 146.

In the same manner as in the first embodiment of the present invention, on the basis of the first image data, the pixels 142 incorporated in the first group of the exposure region 16 are exposed with the light beams 14, and cured. On the basis of the second image data, the pixels 144 incorporated in the second group of the exposure region 16 are exposed with the light beams 14 and cured. Then, on the basis of the third image data, the single pixel sub-group 146 incorporated in the third group of the exposure region 16 is exposed with the light beams 14, and cured. Accordingly, gaps between the pixels for which the curing has been completed are filled up, whereby the curing of resin in the exposure region 16 will be finished. In addition, since a pixel diameter as a minimum unit is generally about 25 μm to 50 μm, each pixel has an area of about $6.25 \times 10^{-4}$ mm$^2$ to $25.0 \times 10^{-4}$ mm$^2$, and a spacing between two neighboring pixels incorporated in the same group is generally about 25 μm to 50 μm.

Then, the XY positioning mechanism 20 is driven by the controller (not shown), the exposure unit 18 is moved in the directions of X and Y, the next (second) position of the exposure unit 18 in the X and Y directions is determined, and a predetermined portion of the region 16 is exposed in the same manner as the above description. This movement of/exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the above description. By repeating sinking of/exposure by the modeling table for several times, a plate-shaped object to be optically modeled can be obtained.

As described above, in the optical modeling method according to the present embodiment, pixels in the first group to be exposed at one time during the first exposure processing do not neighbor each other, and pixels in the second group to be exposed at one time during the second exposure processing do not neighbor each other, either. In this way, since pixel sub-groups neighboring each other are not exposed at one time during the first and second exposure processings, distortion due to curing shrinkage does not spread to the pixel sub-groups neighboring each other. Further, the third group to be exposed at one time during the third exposure processing incorporates therein only single pixel sub-group, and pixel sub-groups neighboring the single pixel sub-group are not exposed at one time, whereby distortion due to the curing shrinkage does not spread to pixel sub-groups neighboring the single pixel sub-group. Namely, if the entire exposure region is exposed at one time, distortion due to the curing shrinkage becomes larger as the distortion spreads within the exposure region, whereby a considerable amount of distortion may be produced on the resin. However, in the present embodiment, the curing shrinkage is produced within a range of one pixel or one single pixel sub-group, whereby distortion due to the curing shrinkage does not spread to pixels or pixel sub-groups neighboring the one pixel or the one single pixel sub-group. Further, the single pixel sub-group incorporated in the third group comprises the remaining neighboring pixels. However, since most of the exposure region has been exposed during the first and second exposure processings, even if the remaining neighboring pixels are exposed at one time during the third exposure processing, any significant distortion is not produced. Moreover, since the pixels that were cured during the first exposure processing are surrounded by uncured resin, the uncured resin is supplied into shrunk portions of the pixels that were cured during the first exposure processing, whereby distortion can be inhibited. In addition, uncured resin is supplied from unexposed portion into shrunk portions of the pixel sub-groups that were cured during the first and second exposure processings, whereby distortion can be inhibited. Consequently, distortion in an object to be optically modeled can be inhibited significantly, whereby modeling with higher precision is made possible.

Since the exposure unit equipped with the DMD exposes a predetermined area of the exposure region at one time, high-speed modeling is made possible.

Further, in the present embodiment, during the first and second exposure processings, pixels are exposed such that two neighboring pixels or more are not exposed at one time. However, each pixel has an area of about $6.25 \times 10^{-4}$ mm$^2$ to $25.0 \times 10^{-4}$ mm$^2$, whereby distortion can be inhibited significantly. Further, a spacing between two neighboring pixels incorporated in the same group is generally about 25 μm to 50 μm, which facilitates uncured resin to be supplied from an unexposed region into the region that was exposed at the initial stage of the exposure, whereby distortion due to the curing shrinkage can be inhibited significantly.

Sixth Embodiment

In a sixth embodiment of the present invention, the exposure region is divided into a plurality of pixels. The plurality of the pixels are exposed such that five neighboring pixels or more are not exposed at one time (namely, 25 pixels (i.e., 2×2=4) are exposed at one time). Thereafter, when unexposed pixels are exposed, the unexposed pixels are divided into two groups, and exposed for each of the two groups such that five neighboring pixels or more are not exposed at one time. The photo-curable resin is exposed three times to cure the resin in an amount of one layer, whereby a plate-shaped object to be optically modeled is obtained. Further, also in the sixth embodiment of the present invention, an optical modeling device that is the same as that in the first embodiment of the present invention is used.

Figure 15:
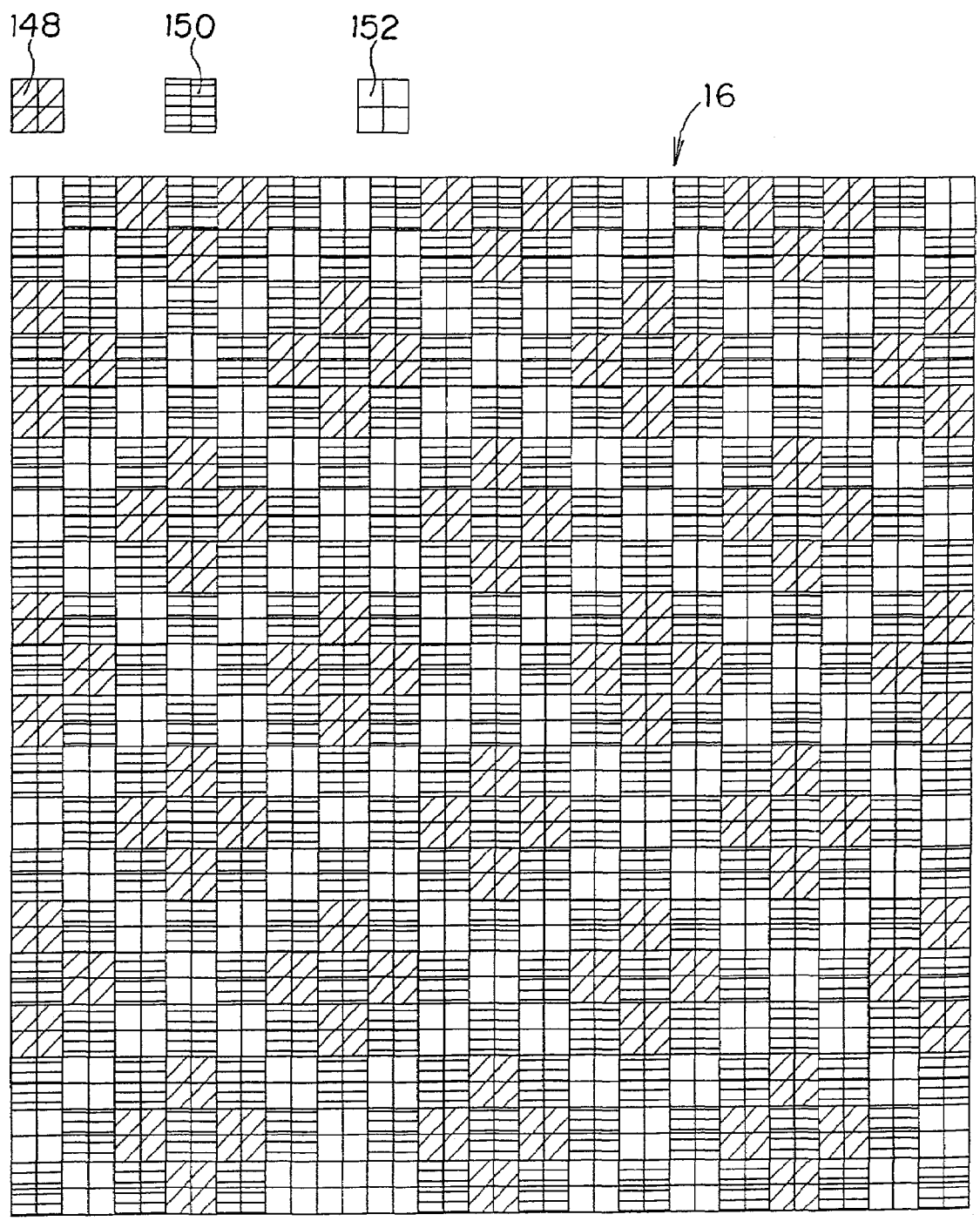
FIG. 15 is a plan view illustrating another example of the exposure pattern of the exposure region.

As shown in FIG. 15, the exposure region 16 is divided into a plurality of pixels. The plurality of the pixels are further divided into three groups including a first group structured by pixel sub-groups 148 comprising four neighboring pixels, a second group structured by pixel sub-groups 150 comprising four neighboring pixels, and a third group structured by pixel sub-groups 152 comprising remaining four neighboring pixels. FIG. 15 shows a portion of the exposure region 18. For example, if the exposure unit 18 equipped with the DMD 28 comprising one million pixels is used, the exposure region 16 can be divided into one million pixels.

Image data corresponding to the exposure region 16 and inputted to the exposure unit 18 is converted to three sets of image data comprising first image data for exposing the pixel sub-groups 148, second image data for exposing the pixel sub-groups 150, and third image data for exposing the pixel sub-groups 152.

In the same manner as in the first embodiment of the present invention, on the basis of the first image data, the pixel sub-groups 148 incorporated in the first group of the exposure region 16 are exposed with the light beams 14, and cured. On the basis of the second image data, the pixel sub-groups 150 incorporated in the second group of the exposure region 16 are exposed with the light beams 14, and cured. Then, on the basis of the third image data, the pixel sub-groups 152 incorporated in the third group of the exposure region 16 are exposed with the light beams 14, and cured. Accordingly, gaps between the pixel sub-groups, for which the curing has been completed, are filled up, whereby the curing of resin in the exposure region 16 will be finished. In addition, since a pixel diameter as a minimum unit is generally about 25 μm to 50 μm, one pixel sub-group incorporated in the first group has an area of about $0.25 \times 10^{-2}$ mm$^2$ to $1.00 \times 10^{-2}$ mm$^2$, and a spacing between two neighboring pixel sub-groups incorporated in the first group is generally about 50 μm to 1 mm.

Then, the XY positioning mechanism 20 is driven by the controller (not shown), the exposure unit 18 is moved in directions of X and Y, the next (second) position of the exposure unit 18 in X and Y directions is determined, and a predetermined portion of the region 16 is exposed in the same manner as the above description. This movement of/exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the first layer. By repeating sinking of/exposure by the modeling table for several times, a plate-shaped object to be optically modeled can be obtained.

As described above, in the optical modeling method according to the present embodiment, pixel sub-groups in the first group to be exposed at one time during the first exposure processing do not neighbor each other, pixel sub-groups in the second group to be exposed at one time during the second exposure processing do not neighbor each other, either, and pixel sub-groups in the third group to be exposed at one time during the third exposure processing do not neighbor each other, either. In this way, since neighboring pixel sub-groups are not exposed at one time, distortion due to the curing shrinkage does not spread to the neighboring pixel sub-groups. Namely, if the entire exposure region is exposed at one time, distortion due to the curing shrinkage becomes larger as the distortion spreads within the exposure region, whereby a considerable amount of distortion may be produced on the resin. However, in the present embodiment, the curing shrinkage is produced within a range of one single pixel sub-group, whereby distortion due to the curing shrinkage does not spread to pixel sub-groups neighboring the one single pixel sub-group. Further, the pixel sub-groups that were cured during the first exposure processing are surrounded by uncured resin, the uncured resin is supplied into the shrunk portions of the pixel sub-groups that were cured during the first exposure processing, whereby distortion can be inhibited. In addition, uncured resin is supplied from unexposed portion into the shrunk portions of the pixel sub-groups that were cured during the first and second exposure processings, whereby distortion can be inhibited. Consequently, distortion in an object to be optically modeled can be inhibited significantly, and modeling with higher precision is made possible.

Since the exposure unit equipped with the DMD exposes a predetermined area of the exposure region at one time, high-speed modeling is made possible.

Further, in the present embodiment, pixels are entirely exposed such that five neighboring pixels or more are not exposed at one time. However, one pixel sub-group incorporated in a first group has an area of about $0.25 \times 10^{-2}$ mm$^2$ to $1.00 \times 10^{-2}$ mm$^2$, whereby distortion can be inhibited significantly. Further, a spacing between two neighboring pixels incorporated in the first group is generally about 50 μm to 1 mm, which facilitates the uncured resin to be supplied from the unexposed region into the region that was exposed at the initial stage of the exposure, whereby distortion due to the curing shrinkage can be inhibited.

Seventh Embodiment

In a seventh embodiment of the present invention, the exposure region is divided into a plurality of pixels. After the plurality of the pixels have been exposed such that five neighboring pixels or more are not exposed at one time (namely, 2×2=4 pixels are not exposed at one time), if unexposed pixels are exposed, the unexposed pixels are divided into two groups, and exposed such that five neighboring pixels or more are not exposed at one time. Then, the remaining pixels are exposed, and a photo-curable resin is cured by exposing the resin three times to be in an amount of one layer, whereby a plate-shaped object to be optically modeled can be obtained. Further, also in the seventh embodiment of the present invention, an optical modeling device that is the same as that in the first embodiment of the present invention is used.

Figure 16:
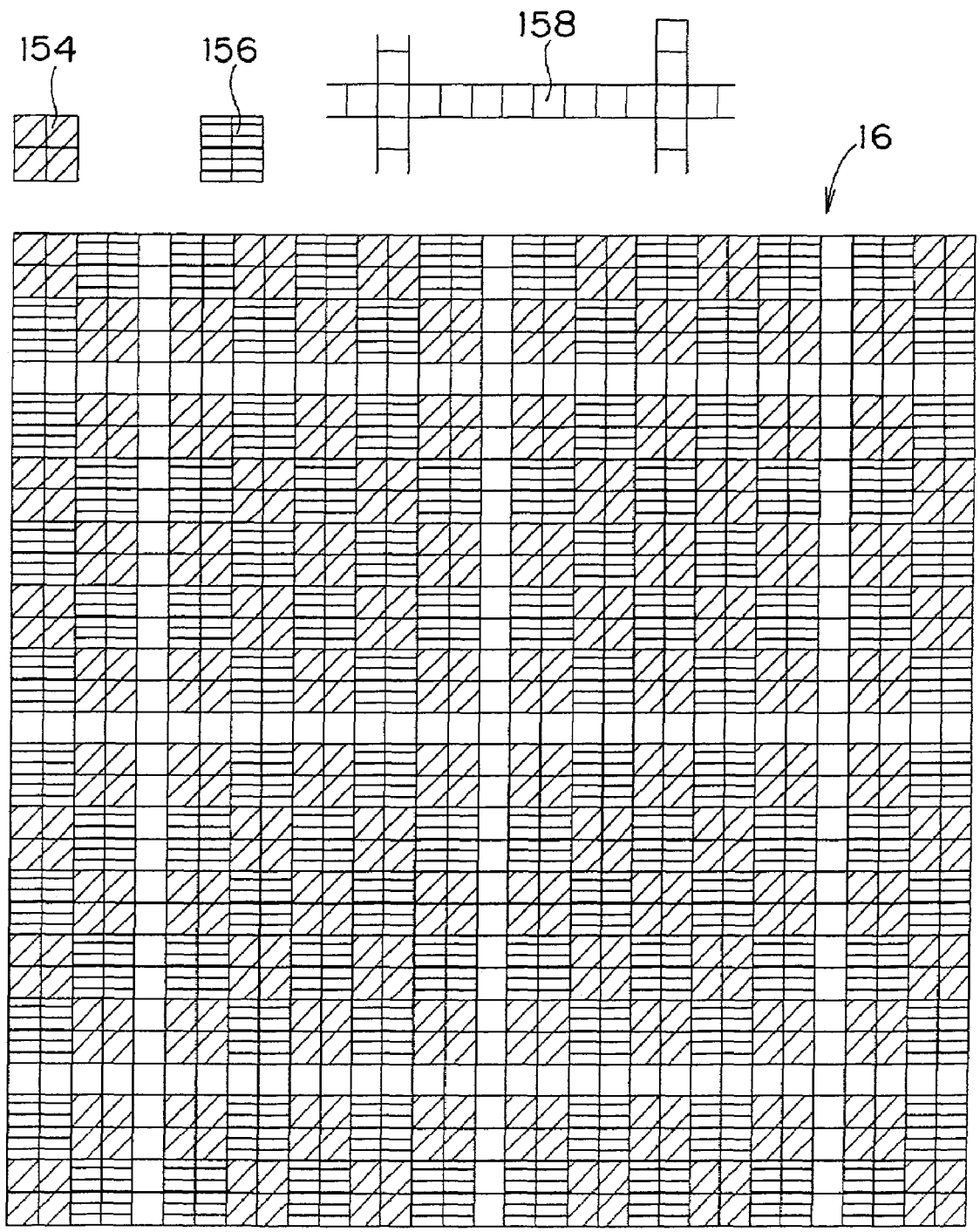
FIG. 16 is a plan view illustrating another example of the exposure pattern of the exposure region.
Figure 17A:
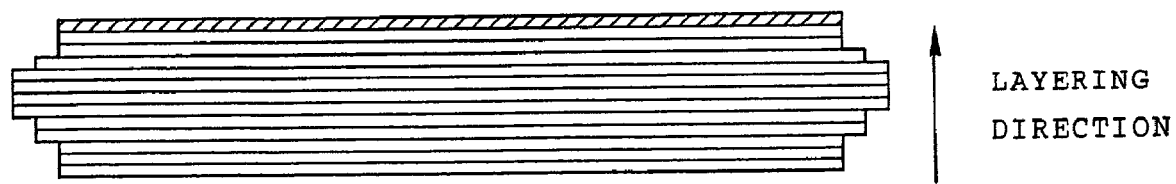
FIG. 17A is a cross-sectional view of a three dimensional model that is formed by layering photo-curable resin layers sequentially.
Figure 17B:
FIG. 17B is a cross-sectional general view of a state in which an object to be modeled deforms due to distortion during the curing of the resin.

As shown in FIG. 16, the exposure region 16 is divided into a plurality of pixels. The plurality of the pixels are further divided into three groups including a first group comprising pixel sub-groups 154 each having four neighboring pixels, a second group comprising pixel sub-groups 156 each having four neighboring pixels, and a third group comprising a single pixel sub-group 158 having remaining neighboring pixels. FIG. 16 shows a portion of the exposure region 18. For example, if the exposure unit 18 equipped with the DMD 28 comprising one million pixels is used, the exposure region 16 is divided into one million pixels.

Image data corresponding to the exposure region 16 and inputted to the exposure unit 18 is converted to three sets of image data comprising first image data for exposing the pixel sub-groups 154, second image data for exposing the pixel sub-groups 156, and third image data for exposing the single pixel sub-group 158.

In the same manner as the first embodiment of the present invention, on the basis of the first image data, the pixel sub-groups 154 incorporated in the first group of the exposure region 16 are exposed with the light beams 14, and cured. On the basis of the second image data, the pixel sub-groups 156 incorporated in the second group of the exposure region 16 are exposed with the light beams 14, and cured. Then, on the basis of the third image data, the single pixel sub-group 158 incorporated in the third group of the exposure region 16 is exposed with the light beams 14, and cured. Accordingly, gaps between pixels, for which the curing has been completed, are filled up, whereby the curing of resin in the exposure region 16 will be finished. In addition, since a pixel diameter as a minimum unit is generally about 25 μm to 50 μm, each pixel sub-group incorporated in the first group has an area of about $0.25 \times 10^{-2}$ mm$^2$ to $1.00 \times 10^{-2}$ mm$^2$, and a spacing between two neighboring pixels incorporated in the first group is generally 50 μm to 1 mm.

Then, the XY positioning mechanism 20 is driven by the controller (not shown), the exposure unit 18 is moved in directions of X and Y, the next (second) position of the exposure unit 18 in X and Y directions is determined, and a predetermined portion of the region 16 is exposed in the same manner as the above description. This movement of/exposure by the exposure unit 18 is repeated several times, and the curing of the photo-curable resin 12 in an amount of one layer is completed. Subsequently, the modeling table (not shown) is moved downwardly by an amount of one layer, and the next resin layer is exposed in a manner similar to the first layer. By repeating sinking of/exposure by the modeling table for several times, a plate-shaped object to be optically modeled can be obtained.

As described above, in the optical modeling method according to the present embodiment, pixel sub-groups in the first group to be exposed at one time during the first exposure processing do not neighbor each other. Pixel sub-groups in the second group to be exposed at one time during the second exposure processing do not neighbor each other, either. The third group to be exposed at one time during the third exposure incorporates therein only a single pixel sub-group. In this way, since pixel sub-groups neighboring each other are not exposed at one time, distortion due to the curing shrinkage does not spread to the pixel sub-groups neighboring each other. Namely, if the entire exposure region is exposed at one time, distortion due to the curing shrinkage becomes larger as the distortion due to the curing shrinkage spreads within the exposure region, whereby a considerable amount of distortion may be produced on the resin. However, in the present embodiment, the curing shrinkage is produced within a range of one pixel sub-group, whereby distortion due to the curing shrinkage does not spread to pixel sub-groups neighboring the one pixel sub-group. Further, pixel sub-groups that were cured during the first exposure processing are surrounded by uncured resin at the peripheries thereof, the uncured resin is supplied into the shrunk portions of the pixel sub-groups that were cured during the first exposure processing, whereby distortion can be inhibited. In addition, uncured resin is supplied from unexposed portion into the shrunk portions of the pixel sub-groups that were cured during the first and second exposure processings, whereby distortion can be inhibited. The single pixel sub-group incorporated in the third group comprises the remaining neighboring pixels. However, since most of the exposure region has been exposed during the first and second exposure processings, even if the remaining neighboring pixels are exposed at one time during the third exposure processing, any significant distortion is not produced. Consequently, distortion in an object to be optically modeled can be inhibited noticeably, and modeling with higher precision is made possible.

Since the exposure unit equipped with the DMD exposes a predetermined area of the exposure region at one time, high-speed modeling is made possible.

Further, in the present embodiment, pixels are entirely exposed such that five neighboring pixels or more are not exposed at one time. However, each pixel sub-group incorporated in the first group has an area of about $0.25 \times 10^{-2}$ mm$^2$ to $1.00 \times 10^{-2}$ mm$^2$, whereby distortion can be inhibited significantly. Further, a spacing between two neighboring pixels incorporated in the first group is generally about 50 $\mu$m to 1 mm, which facilitates uncured resin to be supplied from the unexposed region into the region that was exposed at the initial stage of the exposure, whereby distortion due to the curing shrinkage can be inhibited significantly.

In the above-described first to seventh embodiments of the present invention, a configuration of each pixel is formed into a square. However, it does not make any difference if the pixel is formed into another configuration. The configuration of the pixel is not limited to the square, and can be formed into a polygon such as a triangle, a hexagon, or an octagon or a configuration whose contour includes a curve, such as a circular, an oval or an ellipse.

In the above-described first to seven embodiments of the present invention, description of an example in which a specified optical modeling device is used to carry out the optical modeling method of the present invention has been made. However, another optical modeling device can be used to carry out the optical modeling method of the present invention on the assumption that the exposure region including a plurality of pixels can be exposed (surface exposure) with a plurality of light beams at one time.

In the above-described first to seven embodiments of the present invention, description of an example in which the exposure region is divided into one million pixels, and the number of pixels of a pixel sub-group to be exposed at one time are 25 or less. Generally, it is preferable that the number of pixels incorporated in each pixel sub-group to be exposed at one time is at least 75% of the total number of the pixels of the exposure region. For example, if the exposure region is divided into one million pixels, each pixel sub-group to be exposed at one time may comprise 750,000 pixels or less. The exposure region is divided into two regions. After one of the two regions has been exposed, if the other remaining region is exposed, distortion can be further reduced as compared to a case in which the entire exposure region is exposed at one time. However, if the number of pixels of each pixel sub-group to be exposed at one time exceeds 75% of the total number of the pixels in the exposure region, effects due to division of the exposure region into a plurality of pixels are not exerted sufficiently.

When the total number of pixels in the exposure region is y, it is preferable to determine the predetermined number so as to satisfy the following expression. For example, if the number of pixels in the exposure region is one million, pixels are exposed such that neighboring pixels exceeding one hundred are not exposed at one time.

$$n \leq \frac{\sqrt{y}}{10}.$$

It is particularly preferable that the predetermined number of pixels n is 2 to 26. If the number of pixels incorporated in each pixel sub-group to be exposed at one time is within a predetermined range, distortion due to the curing shrinkage is produced merely within this range without spreading to pixels neighboring the predetermined range of the pixels.

If the pixels that were unexposed at the initial stage of the exposure, it is preferable that the unexposed pixels are exposed such that neighboring pixels exceeding the predetermined number are not exposed at one time. However, also in this case, it is preferable that the number of neighboring pixels less than a predetermined number occupies no more than 75% of the total number of pixels in the exposure region.

Figure 18:
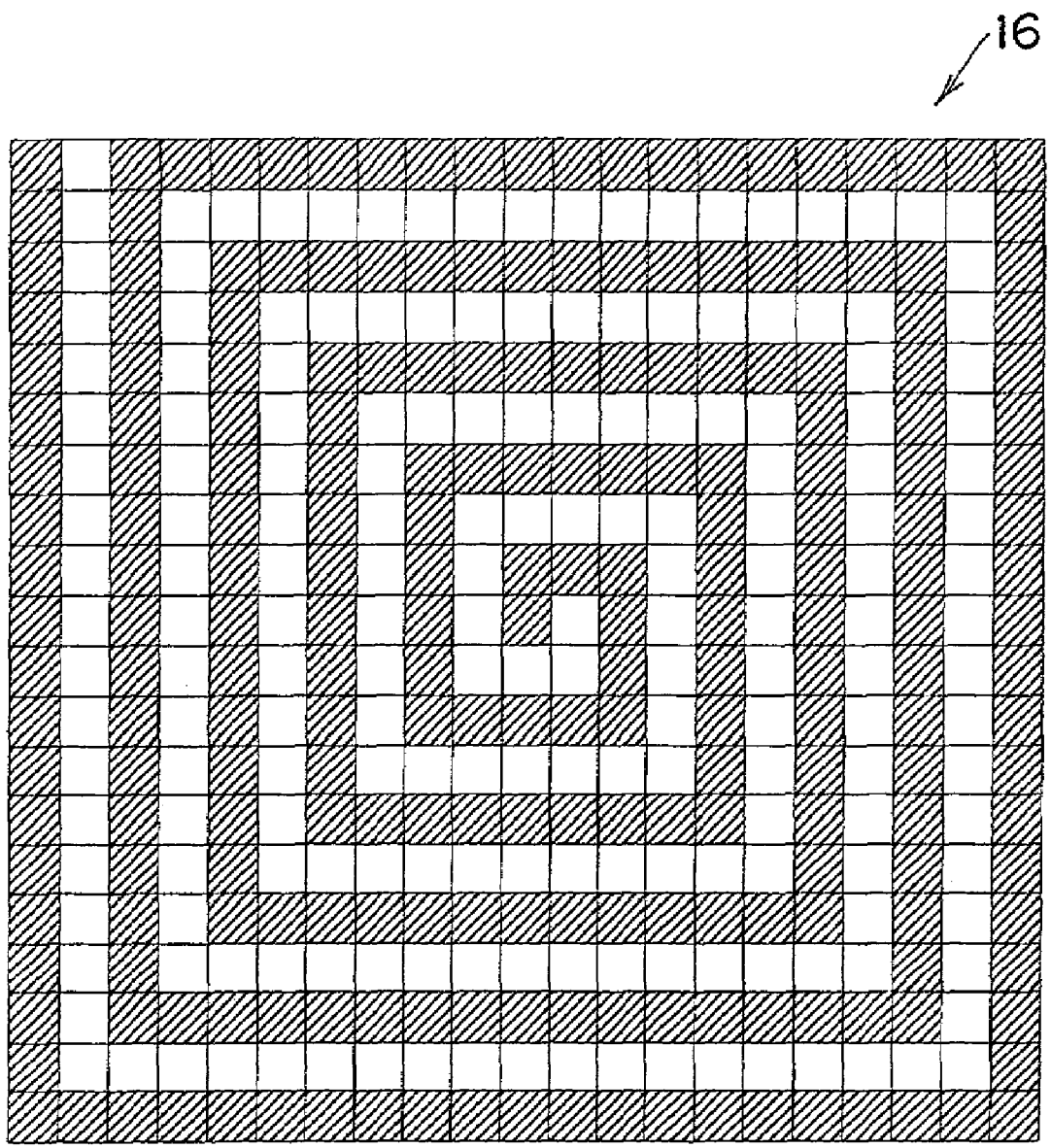
FIG. 18 is a plan view of another example of the exposure pattern of the exposure region.

In the above-described first to seven embodiments of the present invention, description of examples in which pixel sub-groups to be exposed at one time are dispersed and arranged evenly has been made. However, effects of inhibiting distortion change depending on the method of arranging the pixel sub-groups. For example, as shown in FIG. 18, in a case of pixel sub-groups comprising pixels that are spirally arranged in the exposure region, even if a large number of pixels in each pixel sub-group are exposed at one time (namely, the number of neighboring pixels to be exposed at one time), excellent effects of inhibiting distortion can be provided.

In the above-described first to seven embodiments of the present invention, description of an example in which the exposure unit comprising the digital micromirror device (DMD) as a light modulator is used has been made. However, an exposure unit comprising GLV (Grating Light Value) elements as a light modulator array, and a movable mirror can be used. The GLV is suitable for modulating lights linearly, and light sources and the GLV array in which the GLV elements are arranged in a main-scanning direction can be used to structure exposure portions. In this case, it is preferable to dispose a moving portion such as a direct movement positioning mechanism or a scanning portions such as the moving mirror such that the exposure portions are moved relative to the surface of the photo-curable resin such that the GLV array is moved in a sub-scanning direction intersecting the main-scanning direction. A region with a predetermined area can be exposed at one time by the exposure unit comprising the GLV and the moving mirror, whereby modeling at higher speed is made possible.

What is claimed is:

1. An optical modeling method in which a photo-curable resin is exposed with a light beam to form a three-dimensional model, the method comprising the steps of:
   dividing a region of the photo-curable resin to be exposed into a plurality of pixels;
   exposing the pixels such that a number of neighboring pixels that are being exposed at any one time does not exceed a predetermined number; and
   thereafter, exposing unexposed pixels of the region.

2. The method according to claim 1, wherein the predetermined number is not more than 75% of the total number of pixels in the region to be exposed.

3. The method according to claim 1, wherein, if the total number of the pixels in the exposure region is y, the predetermined number n is determined so as to satisfy the expression:

$$n \leq \frac{\sqrt{y}}{10}.$$

4. The method according to claim 1, wherein the predetermined number is from 2 to 26.

5. The method according to claim 1, wherein the area of a group of neighboring pixels that are exposed at the same time is at most 1 mm².

6. The method according to claim 1, wherein groups of neighboring pixels that are exposed at the same time are spaced apart from one another by at least 0.025 mm.

7. The method according to claim 1, wherein the step of exposing unexposed pixels comprises exposing the unexposed pixels such that a number of neighboring pixels that are being exposed at any one time does not exceed another predetermined number.

8. The method according to claim 7, wherein the predetermined number is not more than 75% of the total number of pixels in the region to be exposed.

9. The method according to claim 1, wherein said exposing said pixels occurs simultaneously throughout said region.

10. The method according to claim 1, wherein said pixels that are being exposed form a repeating pattern throughout said region.

11. The method according to claim 1, wherein said pixels are exposed at most once.

12. The method according to claim 1, wherein said region comprises a plurality of sub-groups of said pixels that are being exposed.

13. The method according to claim 1, wherein the region of the photo-curable resin to be exposed is a region within a single layer of the resin.

14. The method according to claim 1, wherein distortion of the photo-curable resin due to shrinkage is reduced by selectively forming unexposed portions of pixels.

15. An optical modeling method in which a photo-curable resin is exposed with a light beam to form a three-dimensional model, the method comprising the steps of:
    dividing a region of the photo-curable resin to be exposed into a plurality of pixels;
    allotting the plurality of the pixels to at least two pixel groups, at least one of the pixel groups including a plurality of non-neighboring pixel sub-groups, which are arranged substantially regularly with a predetermined spacing therebetween;
    exposing a first exposure region of pixels corresponding to at least one of the two pixel groups; and
    exposing a second exposure region of pixels corresponding to each pixel group other than the at least one pixel group of the first exposure region.

16. The method of claim 15, wherein the pixel sub-groups each comprise a plurality of pixels including a predetermined number of neighboring pixels with a predetermined configuration.

17. The method of claim 15, wherein the total number of pixels corresponding to the first exposure region is not more than 75% of the total number of pixels in the region to be exposed.

18. The method of claim 15, wherein, if the total number of pixels in the exposure region is y, the first exposure region is determined such that the total number of pixels in the first exposure region n satisfies the expression:

$$n \leq \frac{\sqrt{y}}{10}.$$

19. The method of claim 16, wherein the predetermined number is from 2 to 26.

20. The method according to claim 16, wherein the predetermined spacing is at least 0.025 mm.

21. The method according to claim 16, wherein the predetermined configuration comprises a substantially square shape.

22. The method according to claim 16, wherein the predetermined configuration is a polygon.

23. The method according to claim 16, wherein the predetermined configuration is a configuration whose contour includes a curve.

24. The method according to claim 15, wherein the step of exposing the second exposure region comprises exposing the each pixel group such that a number of neighboring pixels that are being exposed at any one time does not exceed a predetermined number.

25. The method according to claim 9, wherein said exposing unexposed pixels occurs simultaneously throughout said region.

26. The method according to claim 12, wherein said plurality of sub-groups are exposed simultaneously.

27. The method according to claim 12, wherein said plurality of sub-groups form a repeating pattern.

28. The method according to claim 15, wherein the region of the photo-curable resin to be exposed is a region within a single layer of the resin.

29. The method according to claim 15, wherein distortion of the photo-curable resin due to shrinkage is reduced by selectively forming unexposed portions of pixels.

* * * * *